(12) United States Patent
Yamamoto et al.

(10) Patent No.: US 7,298,064 B2
(45) Date of Patent: *Nov. 20, 2007

(54) ELECTRIC MOTOR AND APPARATUS FOR MANUFACTURING ELECTRIC MOTOR

(75) Inventors: Tomonaga Yamamoto, Fujiyoshida (JP); Takuya Maeda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/340,522

(22) Filed: Jan. 27, 2006

(65) Prior Publication Data

US 2006/0163967 A1 Jul. 27, 2006

(30) Foreign Application Priority Data

Jan. 27, 2005 (JP) .............................. 2005-020271

(51) Int. Cl.
| | |
|---|---|
| H02K 1/17 | (2006.01) |
| H02K 1/18 | (2006.01) |
| H02K 1/27 | (2006.01) |
| H02K 15/02 | (2006.01) |
| H02K 21/12 | (2006.01) |

(52) U.S. Cl. .................... 310/216; 310/54; 310/217; 29/598

(58) Field of Classification Search ................ 310/216, 310/51, 42, 217, 254, 259; 29/596–598
See application file for complete search history.

(56) References Cited

U.S. PATENT DOCUMENTS

| | | | |
|---|---|---|---|
| 3,013,168 A * | 12/1961 | Ellis ............................ 310/166 |
| 5,266,859 A * | 11/1993 | Stanley ........................ 310/216 |
| 6,487,770 B1 * | 12/2002 | Bernauer et al. .............. 29/598 |
| 6,829,815 B1 | 12/2004 | Henschel et al. |
| 6,870,293 B2 * | 3/2005 | Kataoka et al. ............. 310/199 |
| 7,002,277 B2 * | 2/2006 | Yamamoto et al. ......... 310/216 |

(Continued)

FOREIGN PATENT DOCUMENTS

EP  0 111 193  6/1984

(Continued)

OTHER PUBLICATIONS

European search report, mailed Jun. 8, 2007 in related European Patent Application No. 06250461.8.

*Primary Examiner*—Nguyen Tran
(74) *Attorney, Agent, or Firm*—Staas & Halsey LLP

(57) ABSTRACT

A motor capable of reducing cogging torque depending on teeth of a stator, and a motor manufacturing apparatus for manufacturing this motor. The angles of rolling directions of cores stacked are set so that the phase difference between the phases of cogging torques produced on the cores is 180° so that the cogging torques produced on the cores cancel each other to reduce the total cogging torque in the motor. The motor comprises a laminated core formed by stacking a plurality of cores made from a rolled electromagnetic sheet steel. The cores forming the laminated core have rolling directions different from each other by a specified machine angle determined depending on the number of slots and/or the number of poles, where the specified machine angle is an angle which produces a phase difference of 180° between the phases of cogging torques produced due to magnetic anisotropy of the cores and the arrangement of teeth depending on the number of slots and/or poles of the motor.

6 Claims, 20 Drawing Sheets

U.S. PATENT DOCUMENTS

| | | | |
|---|---|---|---|
| 7,067,950 B2 * | 6/2006 | Hirzel et al. | 310/216 |
| 2004/0245887 A1 * | 12/2004 | Fujinaka | 310/254 |
| 2005/0023925 A1 | 2/2005 | Yamamoto et al. | |
| 2005/0229384 A1 * | 10/2005 | Yamamoto et al. | 29/598 |
| 2006/0017345 A1 * | 1/2006 | Uchida et al. | 310/156.56 |

FOREIGN PATENT DOCUMENTS

| | | |
|---|---|---|
| EP | 1 447 901 | 8/2004 |
| JP | 10-66283 | 3/1998 |
| JP | 2004350369 | 9/2004 |
| JP | 2005-65479 | 3/2005 |

* cited by examiner

ROLLING DIRECTION

ROLLING DIRECTION

20°

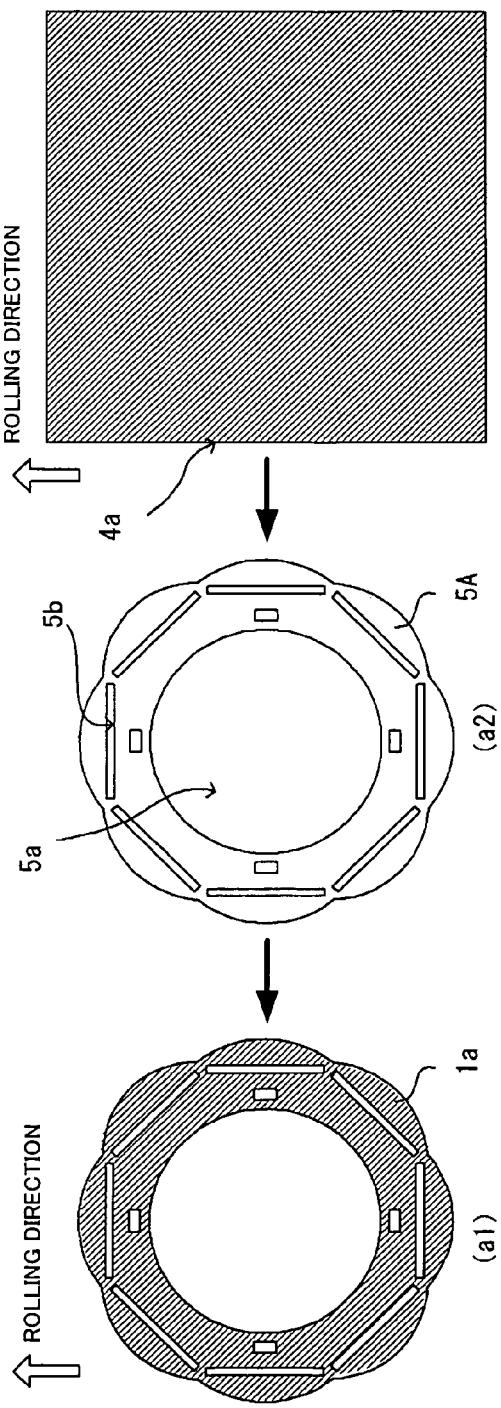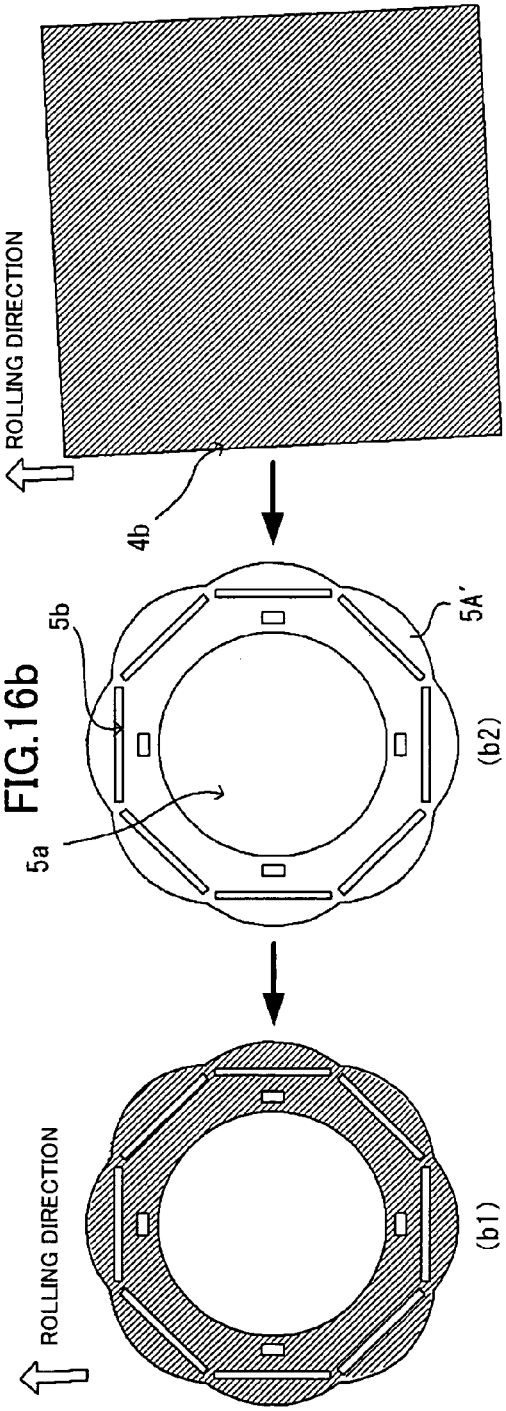

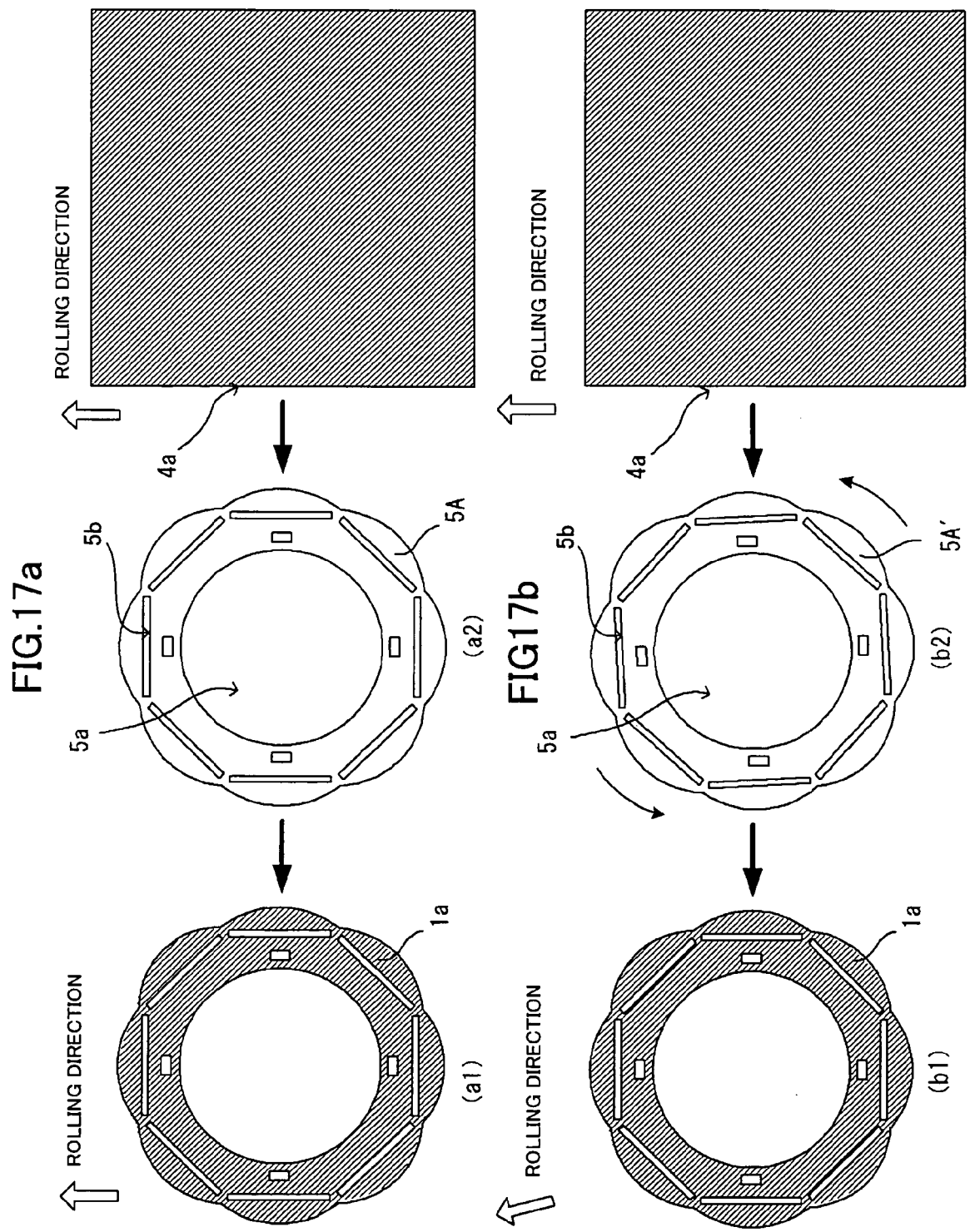

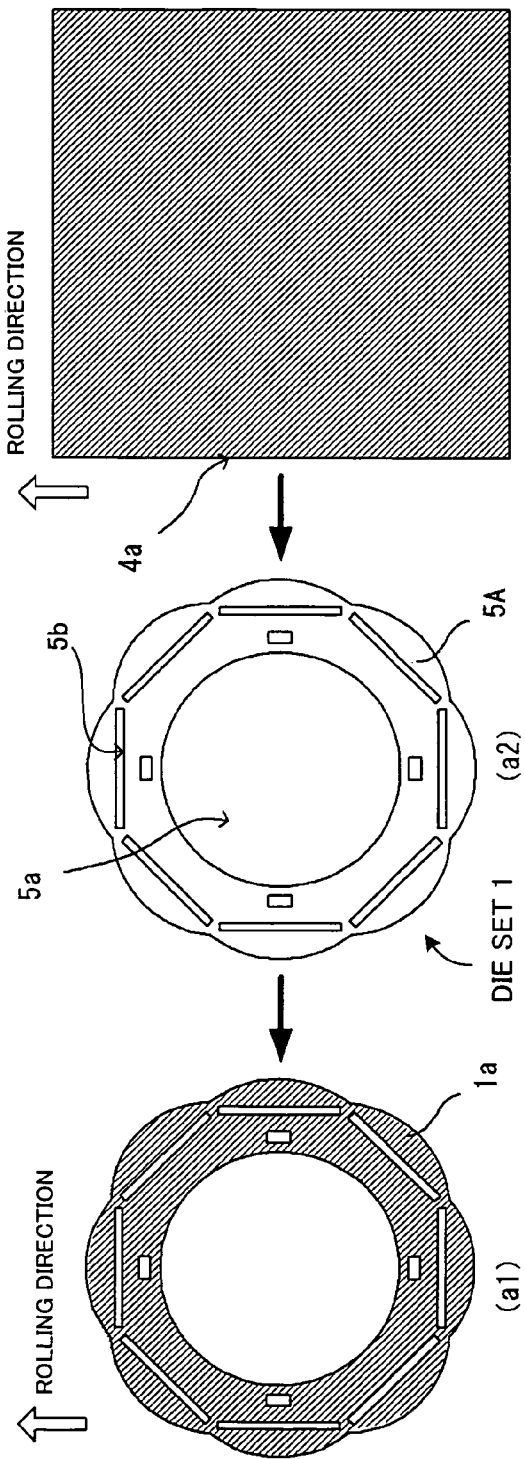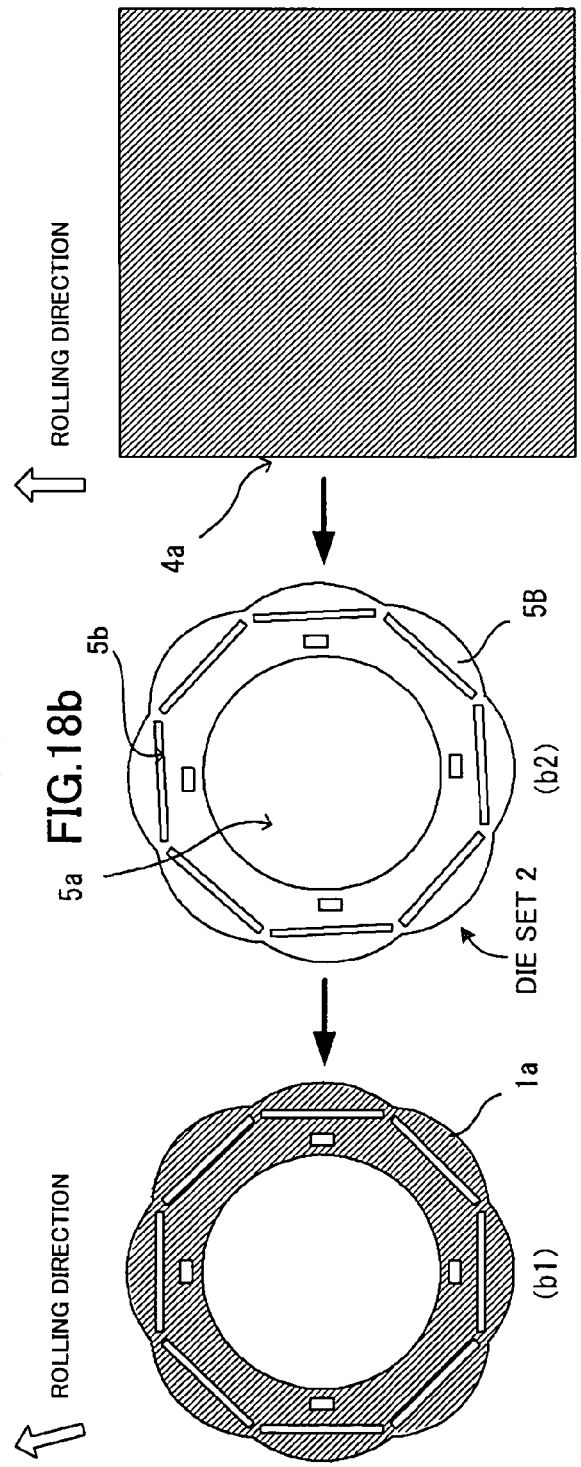

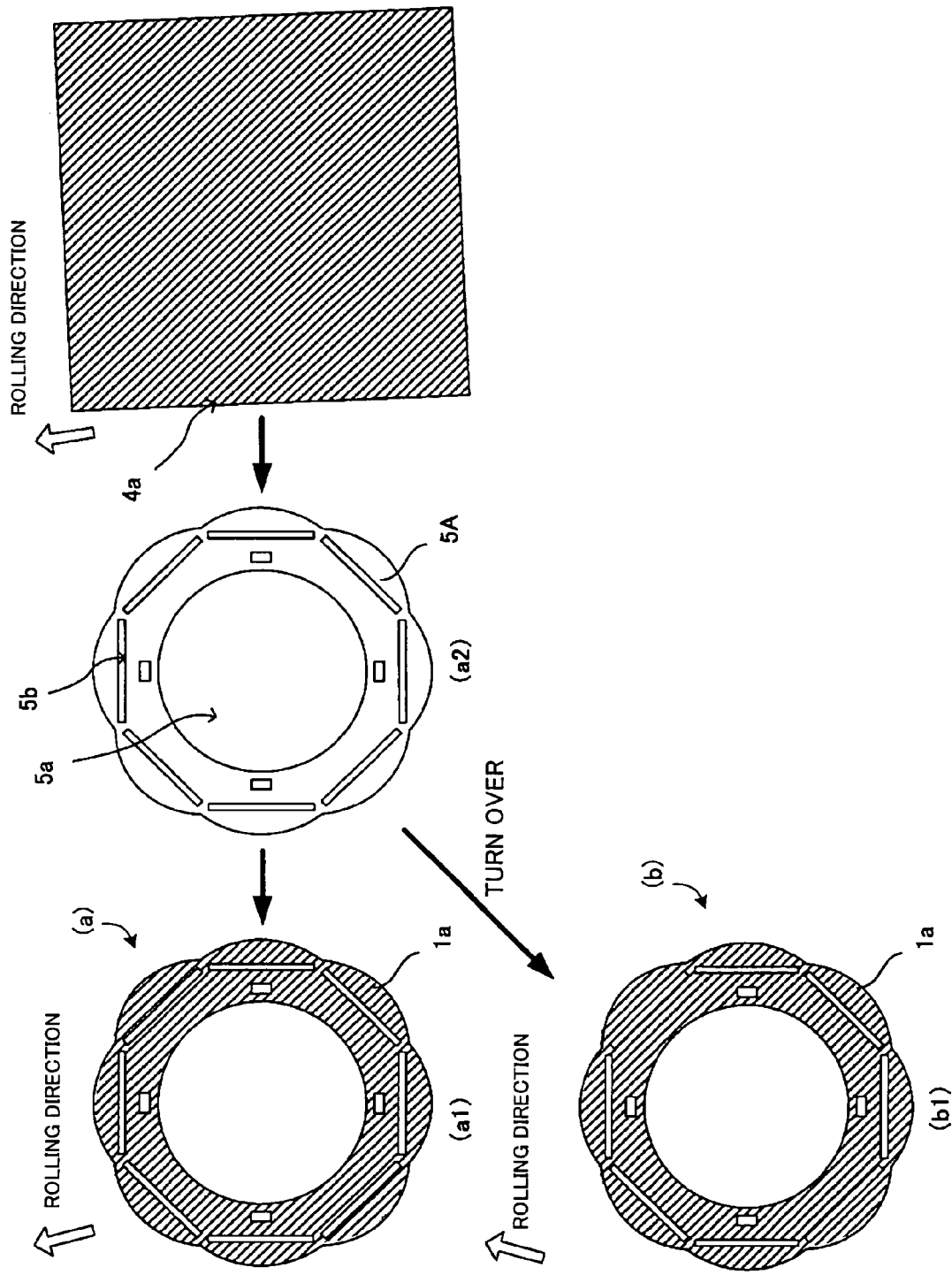

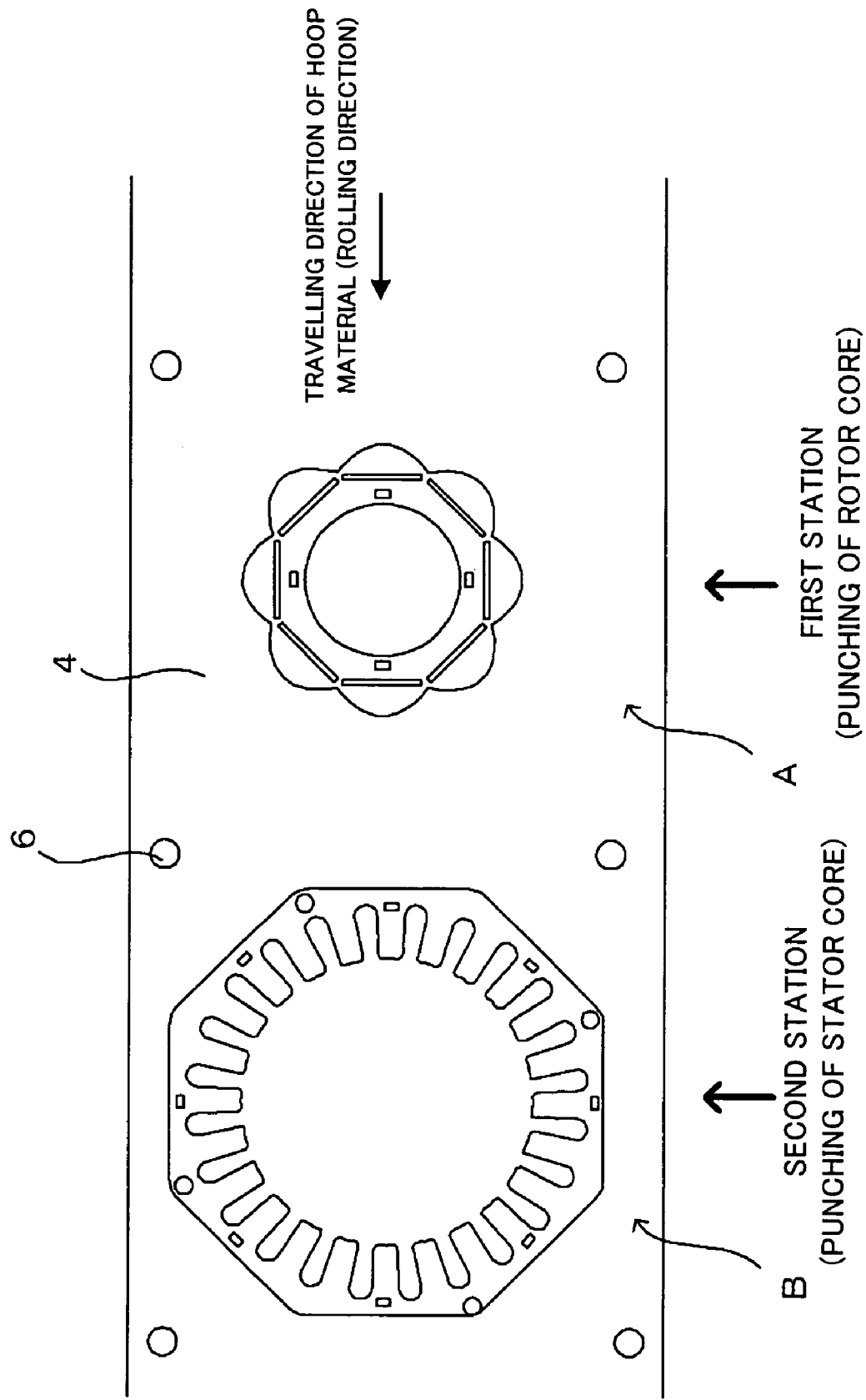

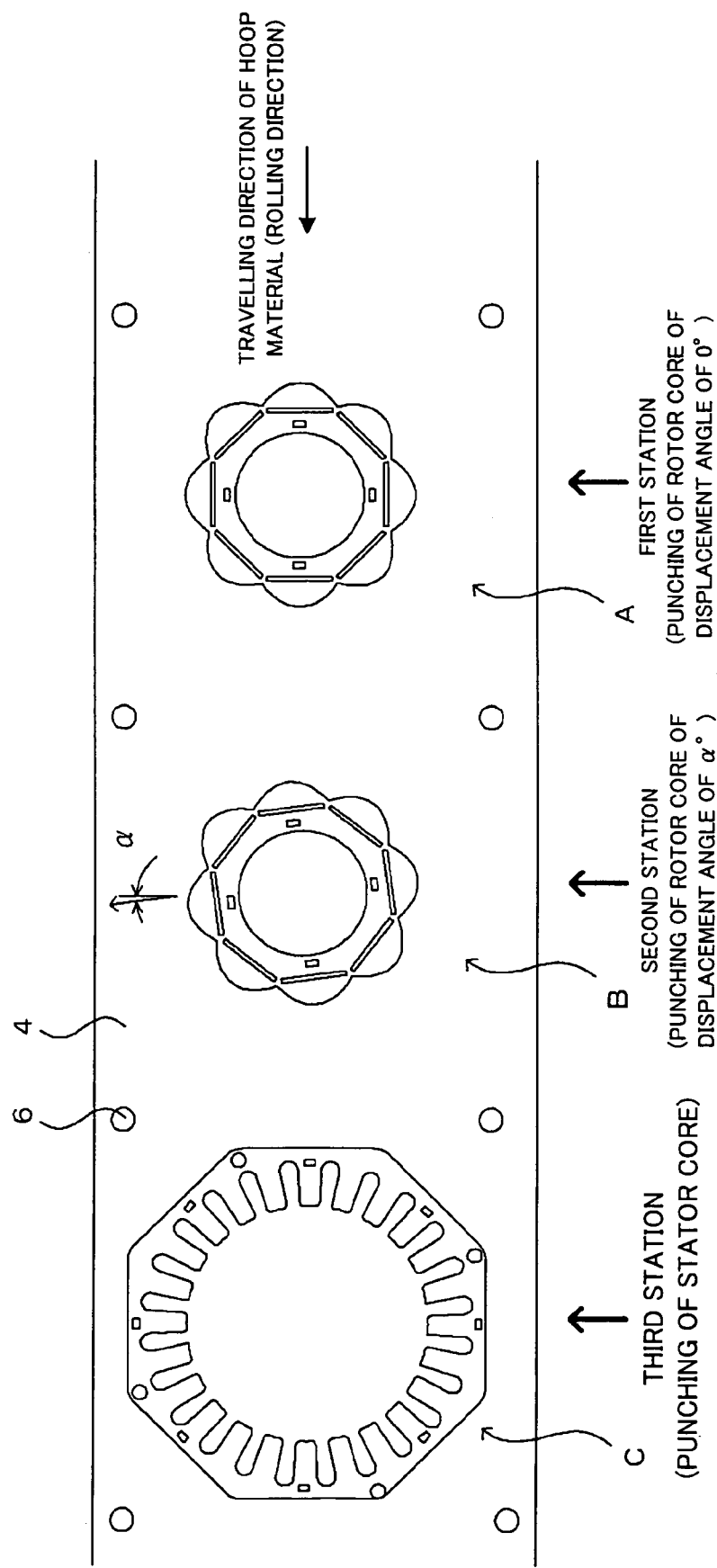

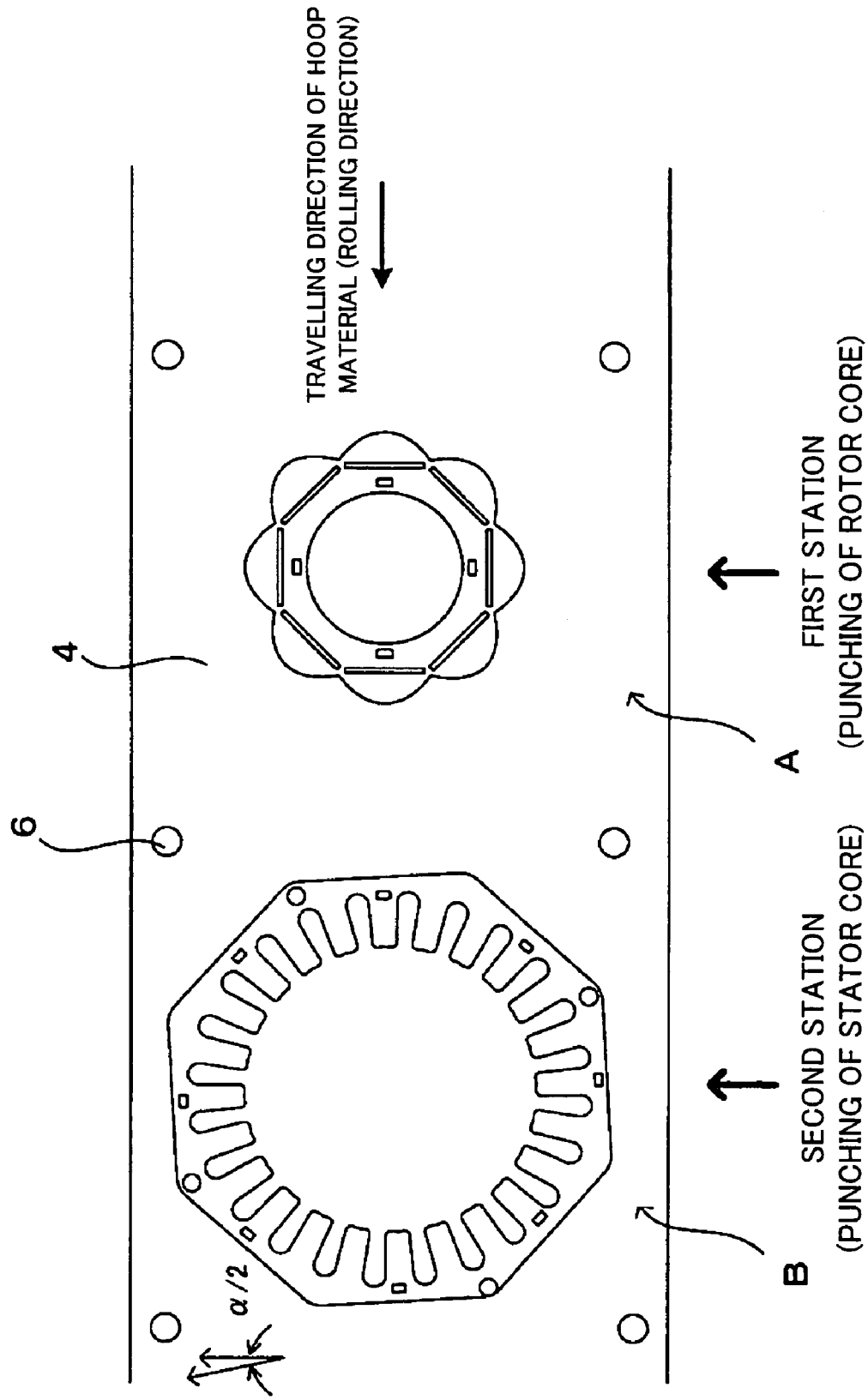

ELECTRIC MOTOR AND APPARATUS FOR MANUFACTURING ELECTRIC MOTOR

BACKGROUND OF THE INVENTION

1. Field of the Invention

The present invention relates to an electric motor and an apparatus for manufacturing an electric motor, and particularly to a technique for reducing cogging torque due to magnetic anisotropy of rolled sheet steel. The present invention is applicable to rotary electrical machines such as motors and generators.

2. Description of Related Art

In a motor comprising a rotor with magnets embedded and a stator with a coil part formed by winding a wire in slots arranged at regular intervals in the circumferential direction, and driven to rotate by torque produced by the magnets and reluctance torque produced by the coil, cogging torque which makes the rotor pulsate is produced when the rotor rotates.

When the magnetic flux lines produced by the magnets in the rotor form closed magnetic paths passing through teeth of the stator, the sum of electromagnetic attractive forces between the stator and the rotor in the direction of rotation, at each rotation angle, varies depending on the relative position of the rotor to the stator. Since the stator has alternating slots and teeth which are different in magnetic resistance, while the rotor passes one slot pitch in its rotation, the direction of the electromagnetic attractive forces changes between the rotor rotation direction and the opposite direction. Thus, torque varies with a frequency proportional to the number of magnet poles or the number of slots, to produce cogging torque.

Conventionally, in order to reduce cogging torque, efforts have been made to improve the rotor structure, the stator structure, and the accuracy of die assemblies for forming the rotor and the stator. For example, there is known a skew arrangement in which layers forming a rotor are stacked in the axial direction, successively displaced in the circumferential direction, namely the rotor rotation direction, equiangularly. This structure is intended to displace the relative positions of the respective magnet poles in the rotor to the teeth of the stator which they are passing by, in the circumferential direction, to thereby displace the positions at which the cogging torques exerted on the respective layers take the maximum value, in the circumferential direction. Also a multi-stage skew arrangement in which the rotor is divided into two or more stages in the axial direction is known.

By adopting the rotor and stator structure like this, cogging torque is reduced but still remains. The inventor of this application found that one of the causes of cogging torque is magnetic anisotropy of electromagnetic sheet steel used for forming the rotor and stator. Rotor cores and stator cores for the motor are made from nondirectional electromagnetic sheet steel. However, even the nondirectional electromagnetic sheet steel has different magnetizing properties in the direction parallel to the direction in which it was rolled (flatten by means of rolls) and in the direction perpendicular to it. This magnetic anisotropy of the electromagnetic sheet steel causes cogging torque.

The applicant of this application made a proposal for removing variation in rotation caused by magnetic anisotropy in a synchronous motor, in JP 10-66283A. JP 10-66283A notes the magnetic anisotropy of a laminated stator, and discloses a method of manufacturing a laminated stator which can reduce torque ripple in the synchronous motor utilizing this magnetic anisotropy.

However, what JP 10-66283A intends to remove is variation in rotation caused by torque ripple, which is different from cogging torque. The applicant of this application also filed a Japanese patent application published as JP 2005-65479A for a motor designed to reduce cogging torque due to the magnetic anisotropy of electromagnetic sheet steel, prior to this application.

Rotor cores and stator cores for forming a motor are formed by punching them from rolled electromagnetic sheet steel (hoop material). FIGS. 1a and 1b are diagrams for explaining the direction in which electromagnetic sheet steel (hoop material) is rolled (referred to as "rolling direction"). In FIGS. 1a and 1b, the longitudinal direction of rolled electromagnetic sheet steel (hoop material) 4 (direction of feeding it) is parallel to the rolling direction, and the width direction of the electromagnetic sheet steel (hoop material) 4 is perpendicular to the rolling direction.

Even the nondirectional electromagnetic sheet steel has different magnetizing properties in different directions, depending on the rolling direction (magnetic anisotropy). Accordingly, the magnets in the rotor produce different magnetic flux densities in different directions, depending on the rolling direction, which causes cogging torque.

In JP 2005-65479A, rotor cores and stator cores for a motor are manufactured by press working such that cores to be stacked have different rolling directions. By arranging that the cores stacked do not have the same rolling direction, cogging torque due to magnetic anisotropy is reduced.

FIG. 2 shows an example of rotor structure. In this example, a rotor is formed by stacking a laminated core #1 and a laminated core #2, each consisting of 10 core plates 1a stacked, and hence, the rotor is formed as a laminated core structure consisting of 20 core plates in all.

The rolling direction of the laminated core #2 (indicated by an arrow in the drawing) is at a specified angle to the rolling direction of the laminated core #1 (indicated by an arrow in the drawing).

FIG. 3 is a diagram for explaining how cogging torque is reduced. In FIG. 3, a waveform of cogging torque of 8 cycles per rotation is shown in solid line, and a waveform of cogging torque of 8 cycles per rotation having a phase difference of 180° with respect to the cogging torque waveform in solid line is shown in broken line. Thus, by adding cogging torques having a phase difference of 180°, the total cogging torque can be made zero.

In JP 2005-65479A, by stacking cores having different rolling directions so that cogging torques having the opposite phases are added together, the total cogging torque is reduced.

The inventor of this application found that in addition to the rolling direction, the stator structure can cause cogging torque. For the stator, apart from a slotless motor, a structure having slots and teeth is known.

In the stator having teeth, the direction of magnetic flux lines is influenced by a tooth so that the magnetic flux lines extend along the tooth. Thus, when the rolling direction does not agree with the direction (orientation) of a tooth, the magnetic flux lines extend along the tooth.

FIG. 4 is a diagram for explaining relation between the rolling direction, the direction (orientation) of a tooth and the direction of magnetic flux lines. In FIG. 4, a rotor 1 and a stator 2 are shown only in part, and the stator 2 has teeth 2c and slots 2f. Suppose that the rolling direction 10 of the stator 2 (direction in which the electromagnetic sheet steel forming the stator 2 was rolled) is at an angle θ to the direction of a tooth. Here, since air and copper exist inside the slot 2f, the part inside the slot 2f has a relative magnetic permeability of about 1. Meanwhile, the tooth 2e, which is made from electromagnetic sheet steel, has a relative magnetic permeability of about 2000. Thus, even when the rolling direction agrees with the direction of the slot 2f, magnetic flux lines do not extend through the slot 2f but extend along the tooth 2e, and hence not parallel to the rolling direction. This means that when the rolling direction is rotated as mentioned above, the reference position for the phase of cogging torque does not rotate correspondingly. Thus, the inventor of this application found that apart from the rolling direction, the stator structure causes cogging torque, and that if the rolling direction is rotated without taking account of the stator structure, cogging torque cannot be reduced satisfactorily.

FIG. 5 is a cogging torque waveform diagram for explaining how the teeth influence the cogging torque. In FIG. 5, waveforms of cogging torques having 32 cycles per rotation are shown. Specifically, a waveform of cogging torque of 32 cycles per rotation is shown in thick solid line, and a waveform of cogging torque in the case where the rolling direction is angularly displaced by a specified angle (here, 5.625°) and there is no influence of restriction of the magnetic flux by teeth is shown in broken line.

Since the phase difference between the cogging torque shown in thick solid line and the cogging torque shown in broken line is 180°, the total cogging torque can be reduced to zero by adding both cogging torques.

A waveform of cogging torque in the case where the rolling direction is angularly displaced by a specified angle (here, 5.625°) and there is influence of restriction of magnetic flux by teeth is shown in thin solid line. Since the magnetic flux are influenced by the teeth, the phase difference between the two cogging torques is not 180°. Hence, the total cogging torque cannot be reduced to zero by adding both cogging torques. Thus, it is difficult to reduce the total cogging torque satisfactorily by the angular displacement of the rolling direction.

FIG. 6 is a diagram showing relation between the phase of cogging torque and the rolling direction. This relates to the case where cogging torque has 32 cycles per rotation. The change of the phase of cogging torque repeats when the rolling direction changes by 360°/32=11.25°.

The number of cycles per rotation of cogging torque due to the magnetic anisotropy of the electromagnetic sheet steel depends on the number of poles in the rotor and the number of slots in the stator. The table below shows an example.

TABLE 1

| Number of poles | Number of slots | Number of cycles on stator, Natural number n | Number of cycles on rotor, Natural number n |
|---|---|---|---|
| 10 | 12 | 10<br>n = 1<br>20<br>n = 2 | 12<br>n = 1 |
| 8 | 24 | 24<br>n = 3 | 24<br>n = 1 |
| 8 | 36 | 32<br>n = 3<br>40<br>n = 5 | 36<br>n = 1 |

According to the example shown in table 1, when the number of poles is 10 and the number of slots is 12, cogging torque exerted on the stator has 10 or 20 cycles per rotation, and cogging torque exerted on the rotor has 12 cycles per rotation. When the number of poles is 8 and the number of slots is 24, cogging torque exerted on the stator has 24 cycles per rotation, and cogging torque exerted on the rotor has 24 cycles per rotation. When the number of poles is 8 and the number of slots is 36, cogging torque exerted on the stator has 32 or 40 cycles per rotation, and cogging torque exerted on the rotor has 36 cycles per rotation.

If the rolling direction of the electromagnetic sheet steel forming the core can be rotated by the angle corresponding to each tooth so that the rolling direction agrees with the direction (orientation) of each tooth, the positional relation between the rotor and the teeth is equivalent to that when the rotor is rotated by the same angle, due to the symmetry between the rolling direction and the shape. Thus, the phase of cogging torque is not influenced by the teeth, so that the conventional phase relation can be applied.

FIGS. 7 to 10 are diagrams for explaining the case where the rolling direction is made to agree with the direction of a tooth. FIG. 7 shows relation between the phase and the rolling direction at angles at which the rolling direction agrees with the directions (orientations) of teeth. The angle (machine angle) of the rolling direction is plotted on the horizontal axis and the phase of cogging torque (in degrees) is plotted on the vertical axis. The diagram relates to the case where cogging torque has 32 cycles per rotation, and shows the above relation in the machine-angle range of 0° to 90°.

The phase of cogging torque changes from 0° to 360° in the machine-angle range corresponding to one slot (here, the width of the range is 11.25°=360°/32). The points in the diagram show the phases at the angles at which the rolling direction agrees with the direction of a tooth. For example, when the number of slots is 36, when the rolling direction is made to agree with the direction of a tooth of the machine angle 10°, the phase is P1. When the rolling direction is made to agree with the direction of a slot of the machine angle 20°, the phase is P2. These correspond to the case where the rotor is rotated just mechanically.

Regarding each slot, it is possible to make the rolling direction agree with the direction of a tooth. FIG. 8 shows the case where the rolling direction is made to agree with the x-axis direction. FIG. 9 shows the case where the rolling direction is rotated by 20° to agree with the direction of one of the teeth of the stator. FIG. 10 shows the case where the rolling direction is made to agree with the x-axis direction and the rotor is rotated by 20°. In FIG. 10, as the rotor rotates, the phase of cogging torque advances.

It is conceivable to stack the same number of cores as slots, such that the cores are rotated by the angle corresponding to one slot, successively. Even in this case, in each core, only some of the teeth have a direction that agrees with the rolling direction. The other many teeth have a direction that does not agree with the rolling direction. Thus, it is difficult to expect reduction of influence of the arrangement of the teeth.

SUMMARY OF THE INVENTION

The inventors of the present application found through experiments that when the number of teeth of a stator is finite, the phase of cogging torque changes approximately in accordance with a straight line connecting phases at angles represented by 360°/a product of the number of slots and a natural number. The present invention is made on the basis of this knowledge.

An electric motor of the present invention has a laminated core structure formed by stacking a plurality of core plates made of rolled material of electromagnetic sheet steel. According to an aspect of the present invention, the core plates are stacked with rolling directions of the electromagnetic sheet steel angularly displaced by a machine angle determined in accordance with the number of slots or poles provided in the laminated core structure so that a phase difference of cogging torques produced by magnetic anisotropy of the core plates is substantially 180°. The cogging torques having a phase difference of 180°are added together so that the cogging torques are canceled with each other.

According to an aspect of the present invention, the same number of core plates are stacked with respective rolling directions of the electromagnetic sheet steel angularly displaced by machine angles with respect to a reference angle so as to produce a phase difference of cogging torques by magnetic anisotropy of the core plates. Each phase $\alpha$ of the cogging torque is represented by $(360 \, n/s) \bmod \{360/(m \cdot s)\} \times m \cdot s$, which is a value obtained by multiplying a remainder of division of an angle $(360 \, n/s)$ of each of slots or poles by an angle $360/(m \cdot s)$ of one cycle of the cogging torque, by $m \cdot s$ which is the number of cycles of the cogging torque per rotation, where s is the number of slots or poles provided in the laminated core structure, and m and n are natural numbers. The machine angles are determined such that the phase difference of the cogging torques is substantially 180° in an approximately rectilinear relation between the phase of the cogging torque and the machine angle of the rolling direction obtained by connecting the phases at respective angles of the slots or poles.

The sum $\Sigma \alpha t$ of products obtained by multiplying respective phases $\alpha$ at the machine angles in the substantially rectilinear relation between the phase of the cogging torque and the machine angle of the rolling direction, and ratios t of the core plates may be within a predetermined range having a central value obtained by multiplying 90° by an odd number, where the ratios t are ratios of thickness of the core plates with rolling directions angularly displaced by the machine angles with respect to an entire thickness of the laminated core structure.

The natural number m may be determined such that the number of cycles $m \cdot s$ per rotation of the cogging torque is close to the number of poles or slots of the laminated core structure.

The predetermined range may be from −45° to +45° with respect to the central value.

The core plates may comprise two type of core plates having rolling directions of the electromagnetic sheet steel different from each other, and the ratio t of the core plates of each type is 0.5.

The machine angle of the rolling directions may be determined taking account of a basic wavelength component and a higher harmonic wave component of the cogging torque.

An apparatus of the present invention is provided for manufacturing an electric motor having a laminated core structure formed by a plurality of core plates made of rolled material of electromagnetic sheet steel. The apparatus comprises punching means for punching the rolled electromagnetic sheet steel by angularly displacing the rolled electromagnetic sheet steel relative to a die set, thereby the plurality of core plates having rolling directions of the electromagnetic sheet steel angularly displaced by the above machine angle.

The punching means may comprise a progressive die device including angular displacement stations having die sets angularly displaced with each other by the machine angle.

The progressive die device may further include a common station having a die set for punching core plates with rolling directions not angularly displaced.

The angular displacement stations may punch core plates having a shape defined by a relatively small number of repetitions of an elemental shape per rotation, and the common station punches core plates having a shape defined by a relatively large number of repetitions of an elemental shape per rotation.

The apparatus may further comprise a station for rotating and aligning core plates punched in two types of stations provided for one shape.

For example, a center hole of a stator is high in shape repetitiveness in respect of rotation, since it is a round shape so that it shows the same aspect at any rotation angle. The slots are high in repetitiveness since the number of the slots is great, and hence, the slots can be punched in a common station. For stations of punching caulking portions, rod holes and an outline, an additional station is required. However, when the outline is a circular shape, the outline can be punched in a common station. By the additional station for rotating core plates, rod positions and outlines of the punched core plates are aligned with each other when the core plates are stacked.

The core plates may be made of electromagnetic sheet steel having crystal orientations different from each other by the machine angle.

The crystal orientation of the electromagnetic sheet steel is a cause of magnetic anisotropy thereof. Generally, the rolling direction agrees with the main crystal orientation (direction in which the electromagnetic sheet steel is easily magnetized). By using electromagnetic sheet steel made with the crystal orientation rotated by a specified angle and electromagnetic sheet steel made with the crystal orientation not rotated, in a pair, it is possible to make cores using a common die set and remove cogging torque due to magnetic anisotropy. Further, it is possible to make cores having a crystal orientation skew at half a specified angle and stack the cores in pairs such that a core not turned over and a core turned over forms a pair, so that there is a difference of the specified angle between the crystal orientations of the paired cores.

Electromagnetic sheet steel having crystal orientations angularly displaced by a half of the machine angle with respect to the rolling direction of the electromagnetic sheet steel, and the punched core plates are stacked with a half number of the punched core plates turned over so that the core plates have the crystal orientations angularly displaced by the machine angle The die set may be arranged angularly displaced by a half of the machine angle with respect to the rolling direction of the electromagnetic sheet steel, and the punched core plates may be stacked with a half number of the punched core plates turned over so that the core plates have the rolling directions of the electromagnetic sheet steel angularly displaced by the machine angle.

The electromagnetic sheet steel may be fed into the die set with rolling directions angularly displaced by a half of the machine angle with respect to the die set, and the punched core plates may be stacked with a half number of the punched core plates turned over so that the core plates have the rolling directions angularly displaced by the machine angle.

In the above arrangements, the number of stations is the same as that in the convention case. Thus, it is possible to deal with magnetic anisotropy without increasing the number of stations. Increase in the number of stations makes the entire length of the die set longer, which may make it impossible to carry out punching with a conventional press machine. In these arrangements, however, the number of stations is not increased, and hence, punching can be carried out without problems, very efficiently.

The present invention can reduce the cogging torque due to magnetic anisotropy of the core plates taking account of teeth of a stator of a motor.

BRIEF DESCRIPTION OF THE DRAWINGS

FIGS. 16a and 16b are diagrams for explaining a first mode for making cores having different rolling directions, FIGS. 17a and 17b are diagrams for explaining a second mode for making cores having different rolling directions, FIGS. 18a and 18b are diagrams for explaining a third mode for making cores having different rolling directions, FIG. 20 is a diagram for explaining a second mode for making cores having an orientation skew at half a specified angle, FIG. 21 is a diagram for explaining how rotor cores and stator cores are punched with a conventional progressive die set, FIG. 22 is a diagram for explaining an example of a progressive die set to which the present invention is applied, and FIG. 23 is a diagram for explaining an example of a progressive die set to which the present invention is applied, (where stator cores rotated by half a specified angle are made).

DETAILED DESCRIPTION

Figure 1A:
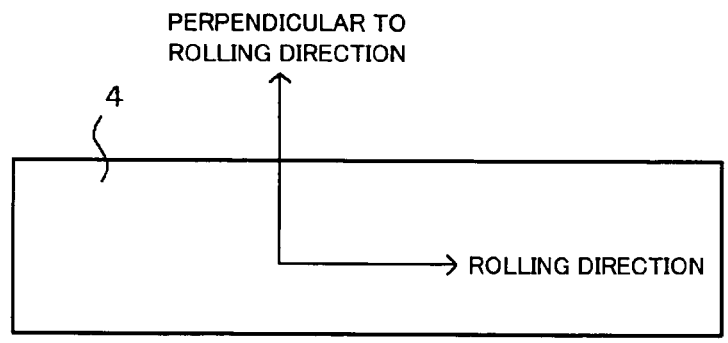
FIGS. 1a and 1b are diagrams for explaining the direction in which electromagnetic sheet steel (hoop material) is rolled.

Referring to the drawings, embodiments of the present invention will be described in detail.

Figure 11:
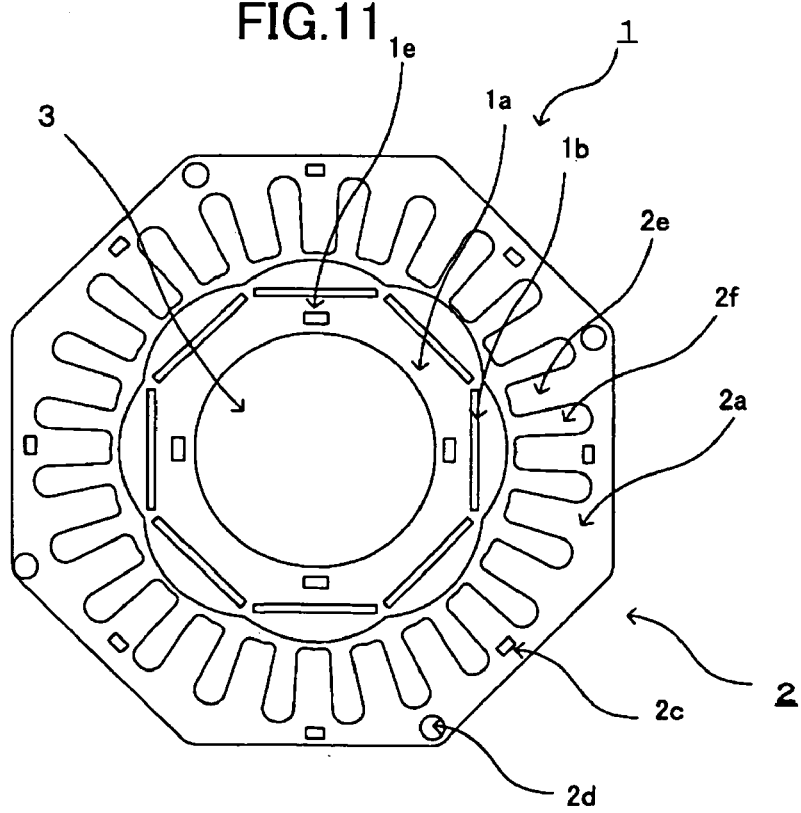
FIG. 11 is a diagram showing an example of an 8-pole 24-slot motor.

FIG. 11 is a diagram for explaining an example of motor structure. In FIG. 11, a motor comprises a rotor 1 and a stator 2, each having a laminated core structure formed by stacking core plates made of electromagnetic sheet steel.

The rotor 1 is formed by stacking a plurality of rotor cores (core plates) 1a. Each rotor core 1a has an opening in the center for passing a shaft 3, which forms a rotation axis of the motor, through it. Magnet holes 1b, the number of which corresponds to the number of poles of the motor, are arranged equiangularly in the circumferential direction, and permanent magnets are embedded in the magnet holes 1b. The rotor core 1a has also crimps 1e for use in fixing the rotor cores stacked.

The stator 2 is formed by stacking a plurality of stator cores (core plates) 2a. Each stator core 2a has an opening in the center for arranging the rotor 1 in it. A plurality of teeth 2f and slots 2f are arranged equiangularly in the circumferential direction, for use in winding a wire. The stator core 2a has also crimps 2c for use in fixing the stator cores stacked, and stator fixing holes 2d for use in fixing the stator. The example shown in FIG. 11 relates to an 8-pole 24-slot motor, where the rotor 1 has 8 poles arranged equiangularly and permanent magnets are arranged for the respective poles. The stator 2 has 24 slots arranged equiangularly.

Figure 1B:
Figure 4:
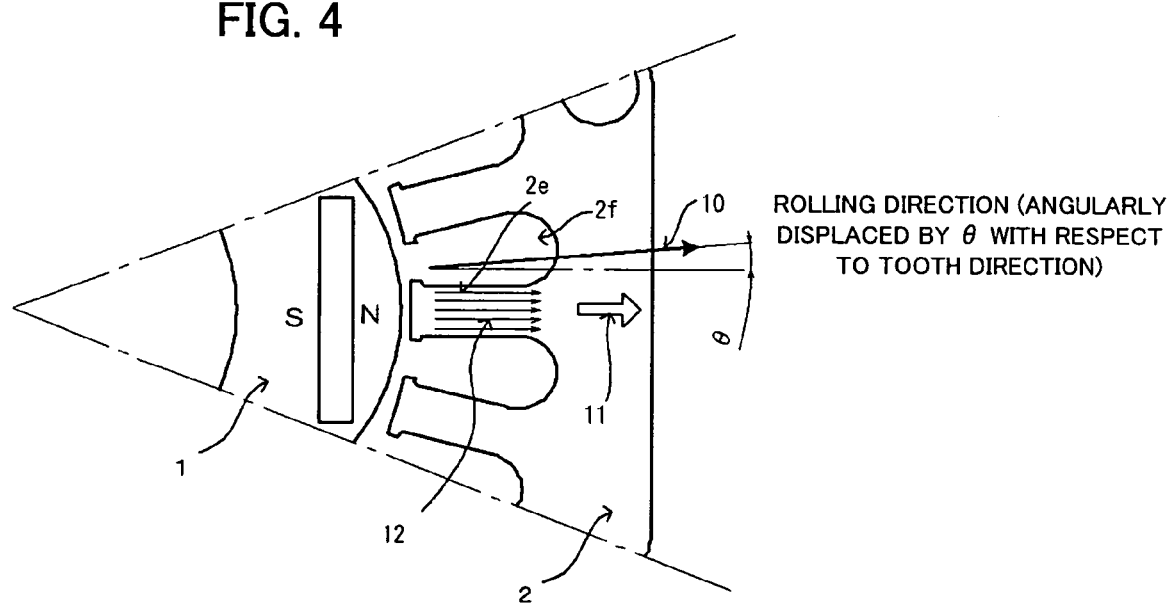
FIG. 4 is a diagram for explaining relation between the rolling direction, the direction (orientation) of a tooth and the direction of magnetic flux lines.
Figure 2:
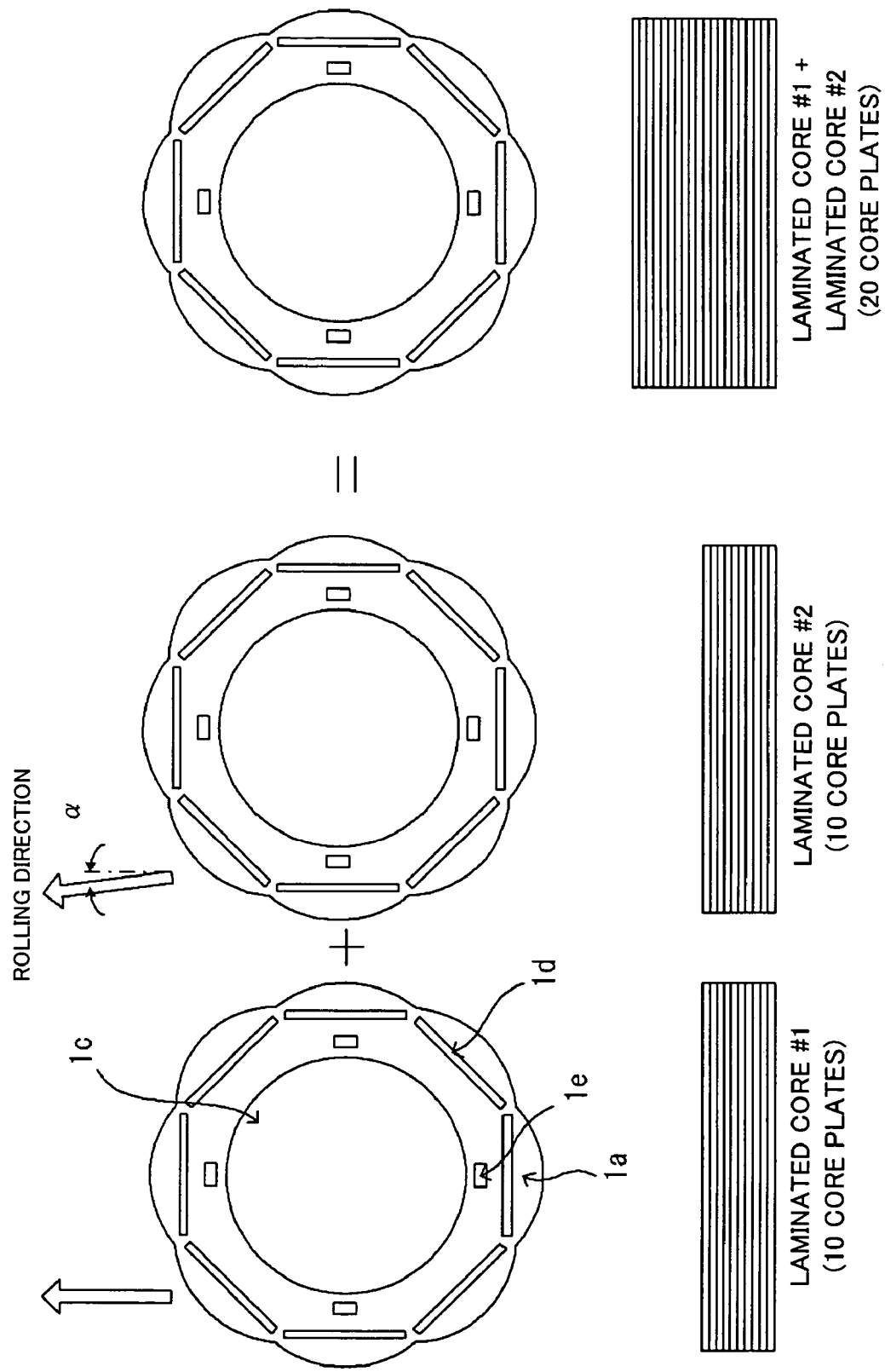
FIG. 2 is a diagram showing an example of rotor structure.
Figure 3:
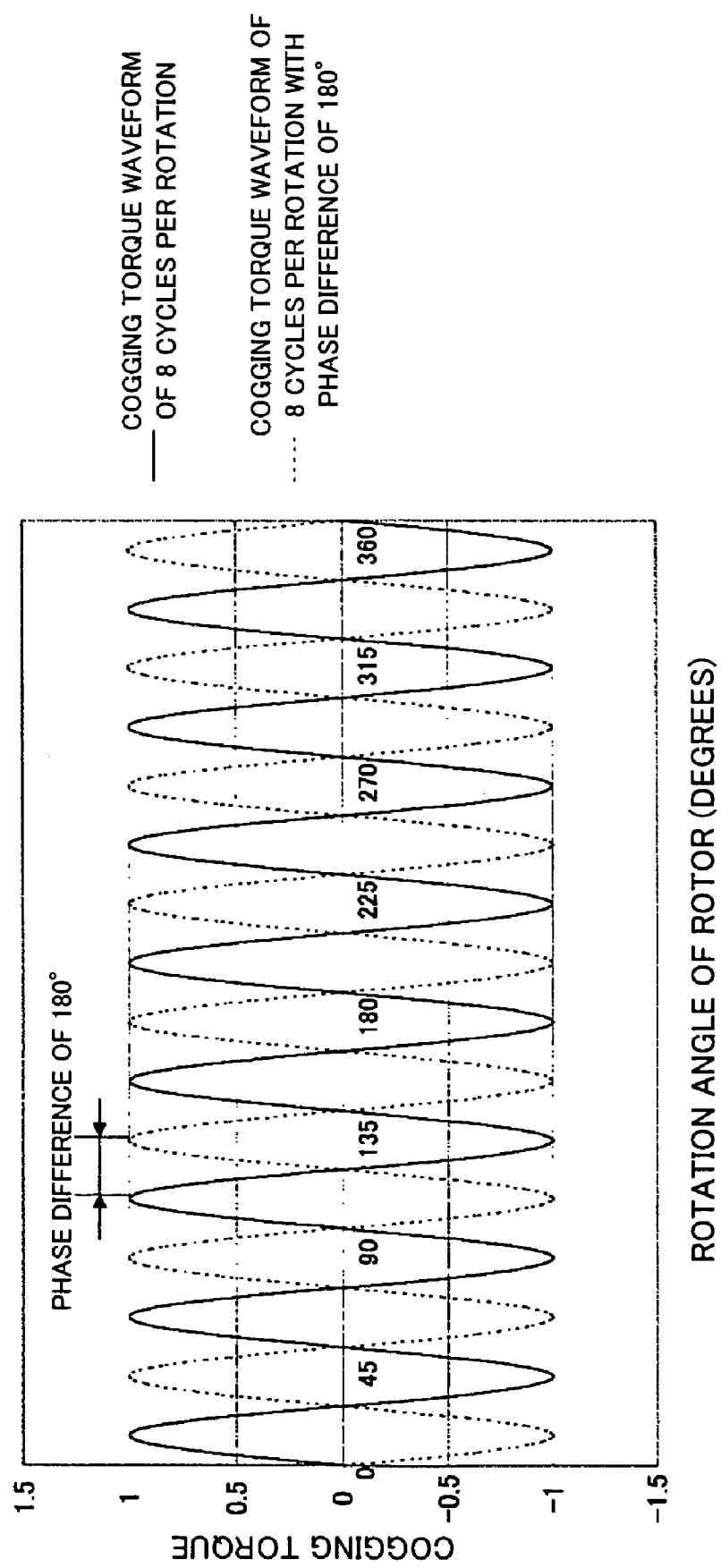
FIG. 3 is a diagram for explaining how cogging torque is reduced.
Figure 5:
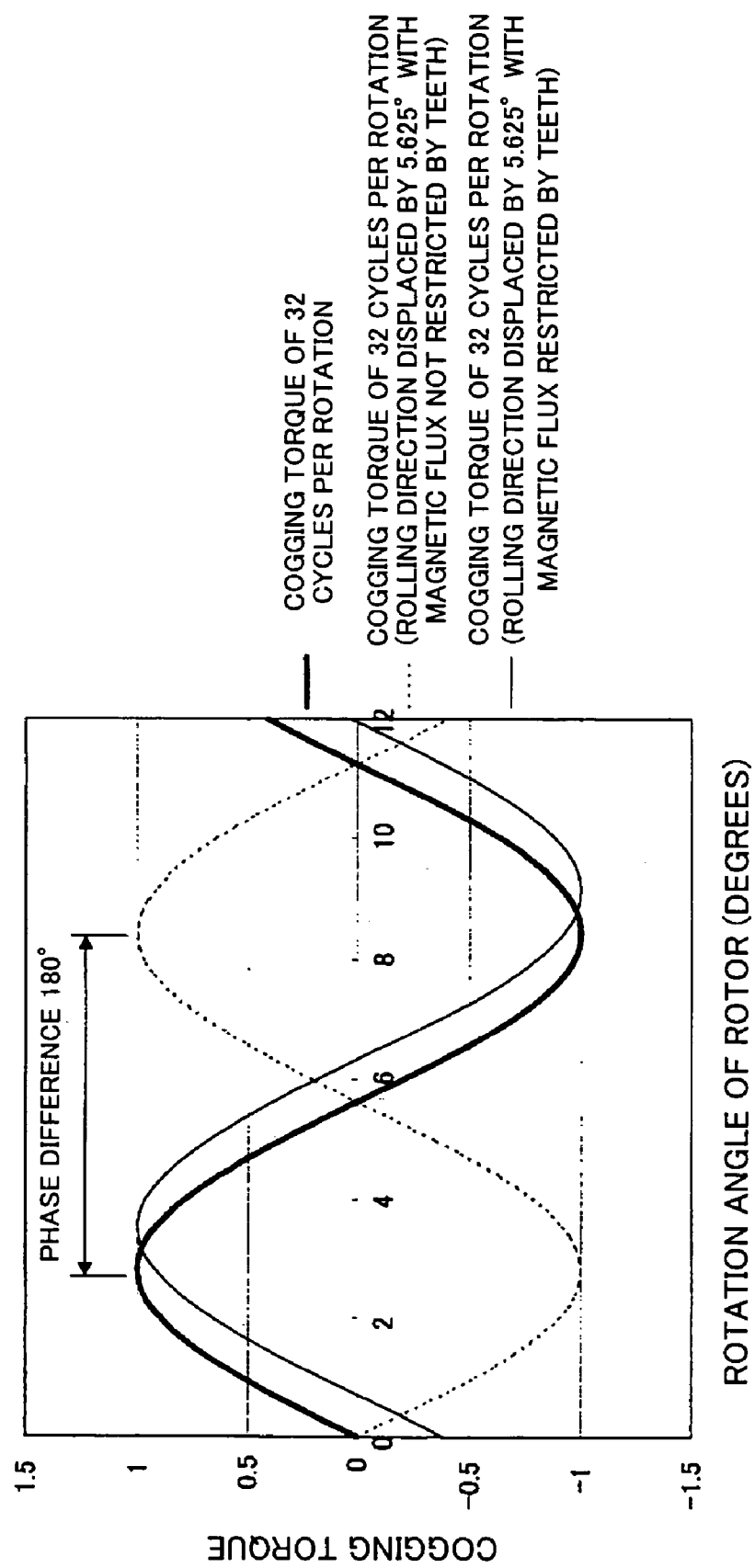
FIG. 5 shows a cogging torque waveform diagram for explaining how a tooth influences cogging torque.
Figure 6:
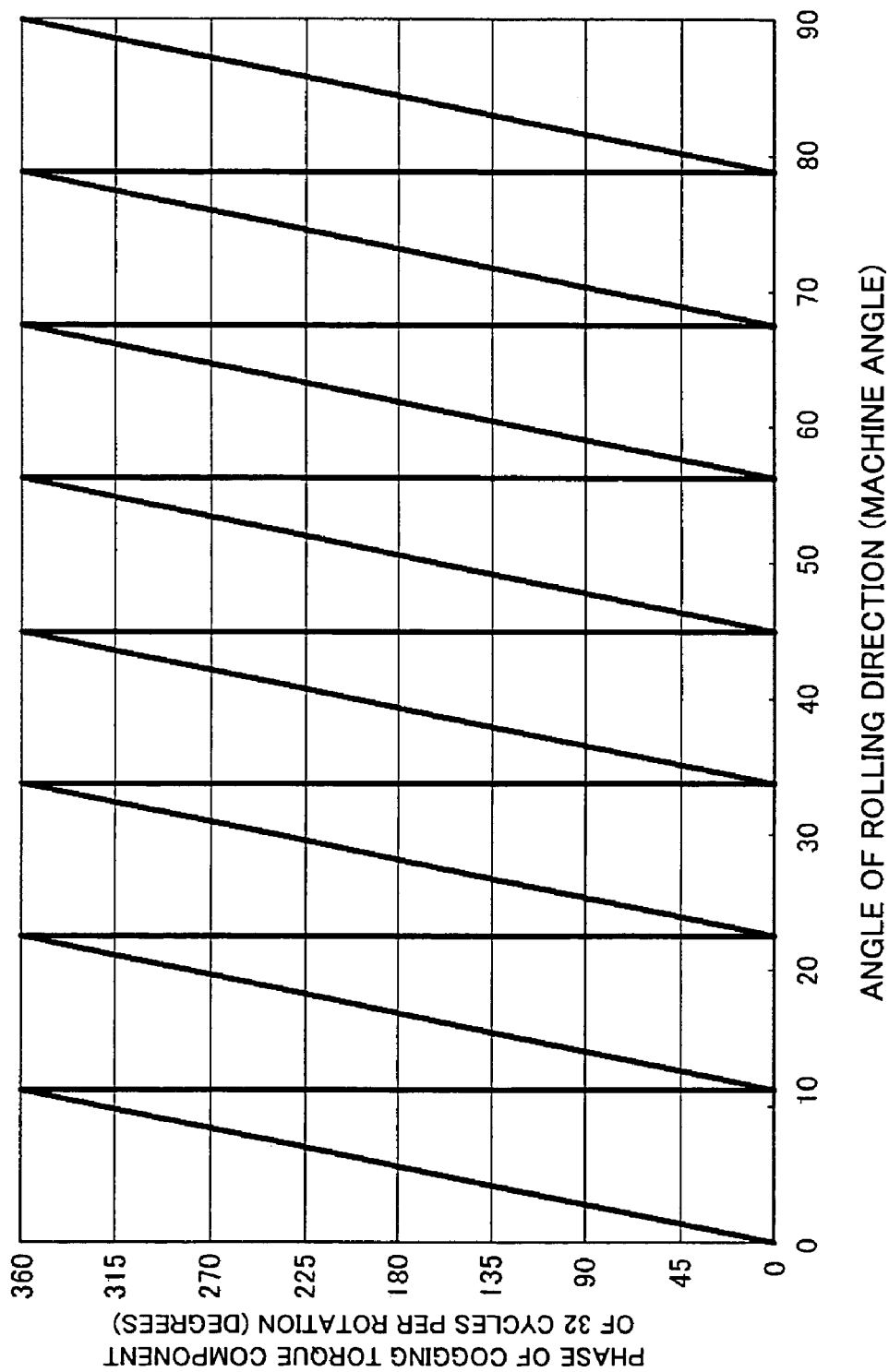
FIG. 6 is a diagram showing relation between the phase of cogging torque and the rolling direction.

The rotor cores 1a and stator cores 2a are formed by punching them from rolled electromagnetic sheet steel (hoop material) 4 as shown in FIG. 1.

Figure 7:
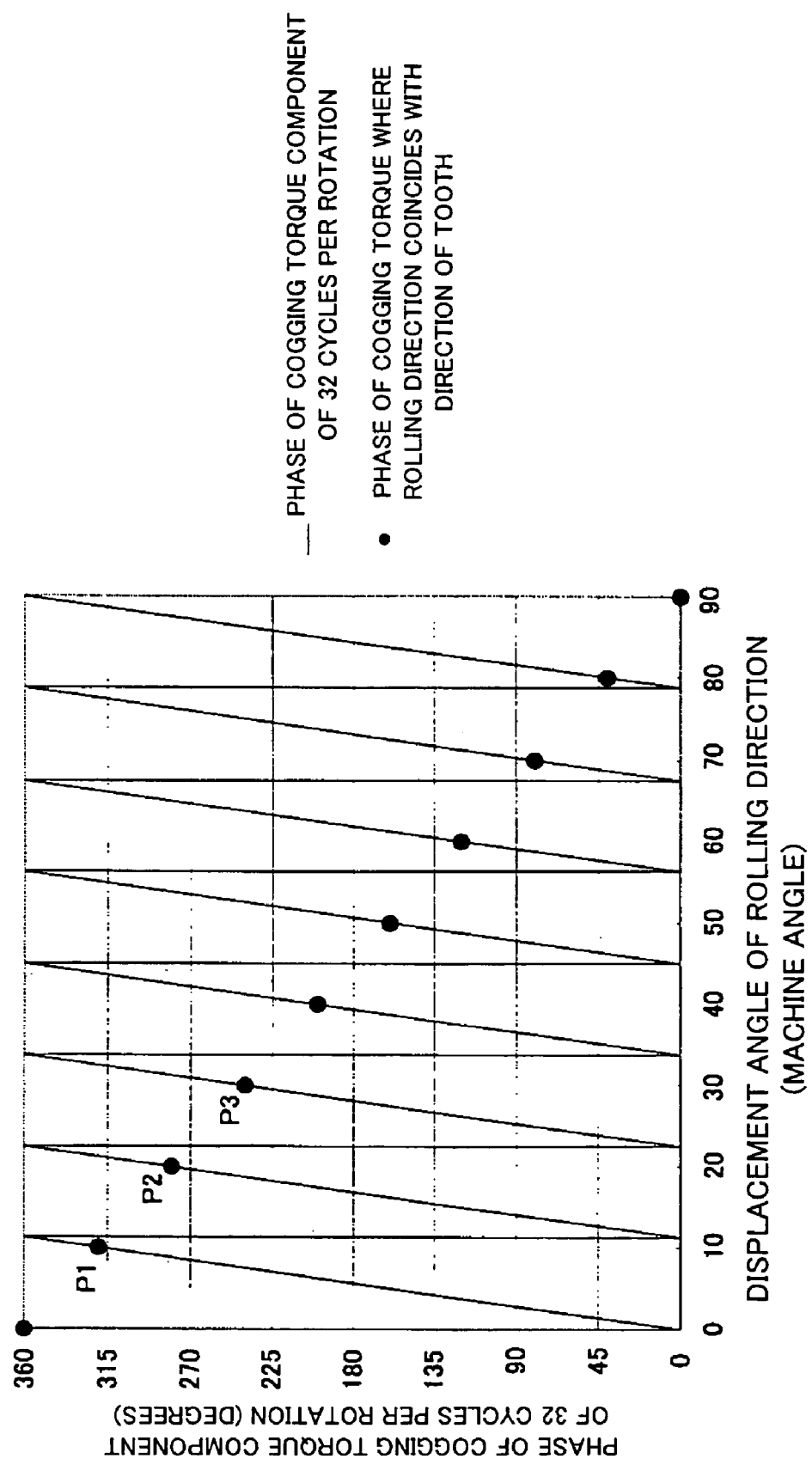
FIG. 7 is a diagram showing relation between the phase and the rolling direction at angles at which the rolling direction agrees with the direction (orientation) of a tooth.
Figure 8:
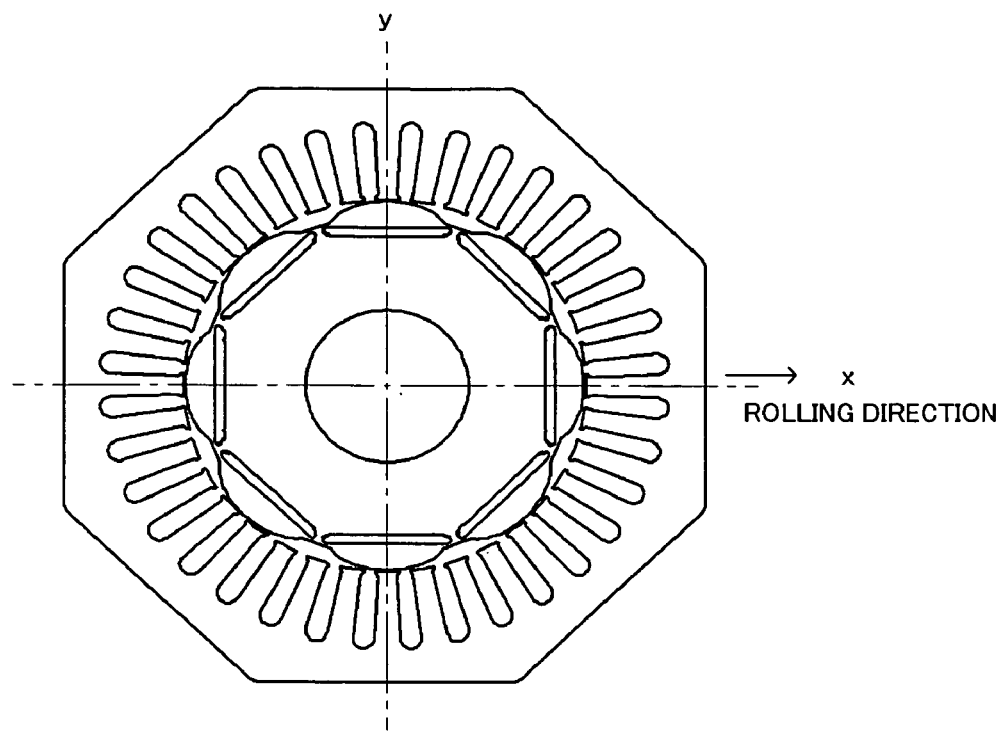
FIG. 8 is a diagram showing a case where the rolling direction is made to agree with the x-axis direction.
Figure 9:
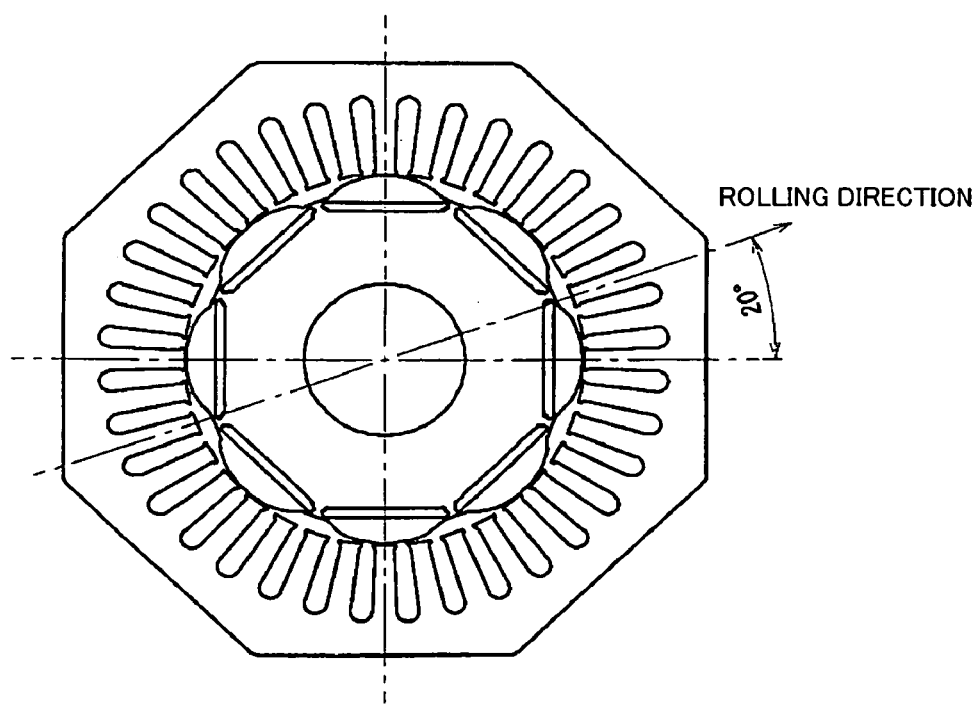
FIG. 9 is a diagram showing a case where the rolling direction is rotated by 20° to agree with the direction of one of the slots of a stator.
Figure 10:
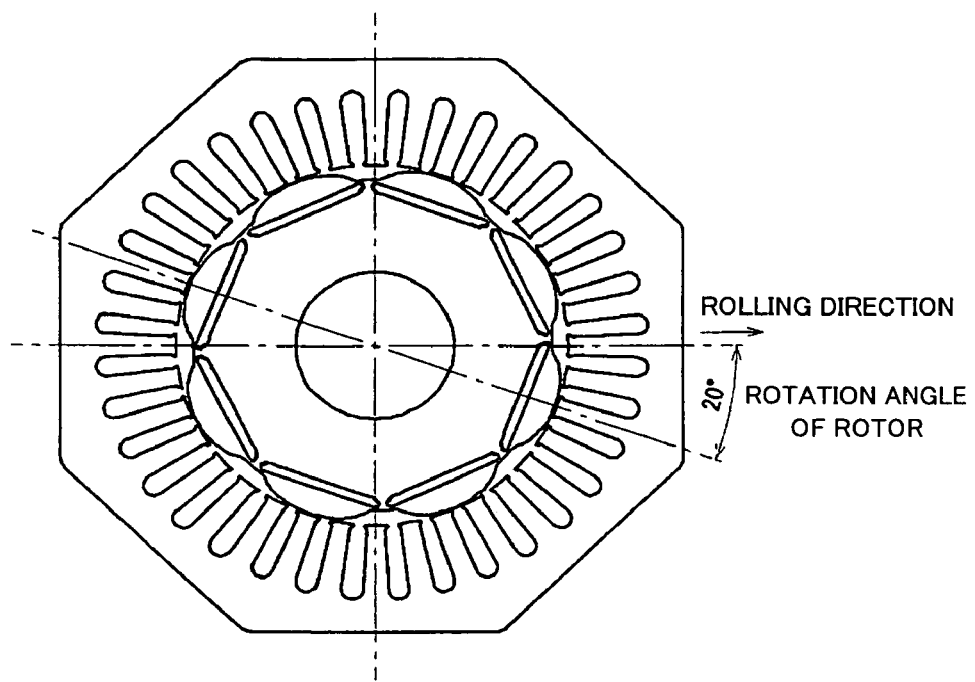
FIG. 10 is a diagram showing a case where the rolling direction is made to agree with the x-axis direction and a rotor is rotated by 20°.
Figure 12:
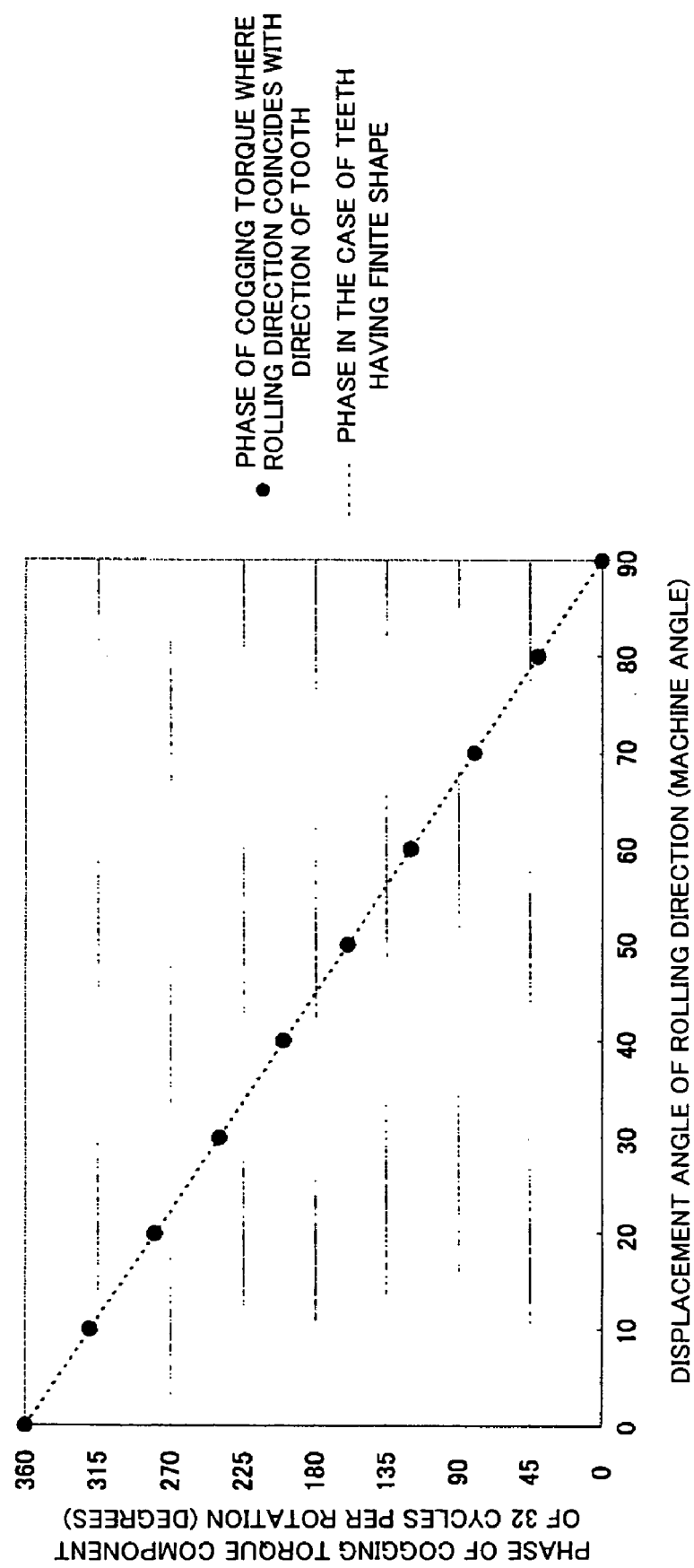
FIG. 12 is a diagram showing relation between the angle of the rolling direction and the phase of cogging torque.

Regarding the relation between the phase and the rolling direction at angles at which the rolling direction agrees with the direction of a tooth shown in FIG. 7, the phase of cogging torque changes from 0° to 360° in the machine-angle range corresponding to one tooth (here, the width of the range is 11.25°=360°/32). The points in the diagram show the phases at the angles at which the rolling direction agrees with the direction of a tooth. The line connecting these points at which the rolling direction agrees with the direction of a tooth is a rectilinear line. FIG. 12 shows relation between the angle of the rolling direction (referred to as "rolling-direction angle") and the phase of cogging torque. By connecting the points at which the rolling direction agrees with the direction of a slot, a rectilinear line (shown in broken line in the diagram) representing the phase relation is obtained.

In FIG. 12, the angle (machine angle) of the rolling direction is plotted on the horizontal axis and the phase of cogging torque (in degrees) is plotted on the vertical axis. From this rectilinear phase relation, the phase of cogging torque at a rolling-direction angle can be obtained. For example, the phase of cogging torque at the rolling-direction angle 0° is 360°, and the phase of cogging torque at the rolling-direction angle 90° is 0°. Between these, the phase of cogging torque changes almost linearly with the change of the rolling-direction angle.

Suppose that s is the number of slots or poles, and that cogging torque due to magnetic anisotropy has (ms) cycles per rotation (where m is a natural number). As already mentioned, the phase α of cogging torque at a slot position or a pole position can be obtained from the relation shown in FIG. 7 and represented by the expression:

$$\text{Phase } \alpha = (360n/s) \bmod (360/ms) \times (m \times s) \quad (1)$$

In the expression (1), (360 n/s) represents the angle value of a tooth, and (360/(m×s)) represents the angle value for one cycle of cogging torque. The above expression means that the remainder in the division of the angle value of a slot (360 n/s) by the angle value for one cycle of cogging torque (360/(m×s)) is multiplied by (m×s).

The number of cycles of cogging torque per rotation (m×s) is a higher harmonic wave (multiple) of the number of slots or poles. If it is a higher harmonic wave of the number of slots, it is close to the number of poles, and if it is a higher harmonic wave of the number of poles, it is close to the number of slots.

The angle of a tooth can be represented by 360/(n×s) n is a whole number which can take a value in the range of 0 to the number of slots. The angle of a tooth corresponds to the angle θ by which the rolling direction is rotated. The rectilinear line in FIG. 12 can be represented by the equation α=a×θ+b which represents a line connecting a series of points in FIG. 7.

From the above expression representing the phase α, the angle θ is an angle which produces a phase difference of 180° between the phases α at a tooth position or a pole position of cogging torques produced due to magnetic anisotropy and oscillating ms time per rotation, where s is the number of slots or poles in the core, and m is a natural number.

Table 2 shows calculated values of mod and phase α according to the above expression, for different tooth angles, in the case where cogging torque has 32 cycles per rotation.

TABLE 2

| A<br>Angle of tooth | B<br>Value of mod | A * B * ms (=32)<br>α |
|---|---|---|
| 0 | 0 | 0 |
| 10 | 10 | 320 |
| 20 | 8.75 | 280 |
| 30 | 7.5 | 240 |
| 40 | 6.25 | 200 |
| 50 | 5 | 160 |
| 60 | 3.75 | 120 |
| 70 | 2.5 | 80 |
| 80 | 1.25 | 40 |
| 90 | 0 | 0 |

As mentioned above, by adding cogging torques having a phase difference of 180°, it is possible to make the cogging torques cancel each other. By applying this relation to the phase relation represented by the rectilinear line in FIG. 12, namely, by giving a difference in rolling-direction angle which produces a phase difference of 180° on the basis of the rectilinear line, it is possible to make cogging torques cancel each other.

Specifically, by obtaining, on the rectilinear line in FIG. 12, rolling-direction angles which produce a phase difference of 180°, and stacking two types of cores equal in number and having the rolling directions which meet the above relation, it is possible to make the cogging torques produced on these two types of cores depending on the slots cancel each other to reduce the total cogging torque.

Suppose that two cores are stacked. When the rolling direction of one of two cores is set at the angle 0°, the phase of cogging torque exerted on this core is 360°. In order to cancel this cogging torque, a core receiving cogging torque having a phase 180° should be stacked. The rolling direction angle of the core receiving cogging torque having a phase 180° can be obtained on the rectilinear line in FIG. 12.

In FIG. 12, the rolling direction angle at which the phase of cogging torque is 180° is 45°. Hence, by stacking a core having a rolling direction angle (machine angle) 0° and a core having a rolling direction angle (machine angle) 45°, cogging torque depending on the slots can be reduced.

Figure 13:
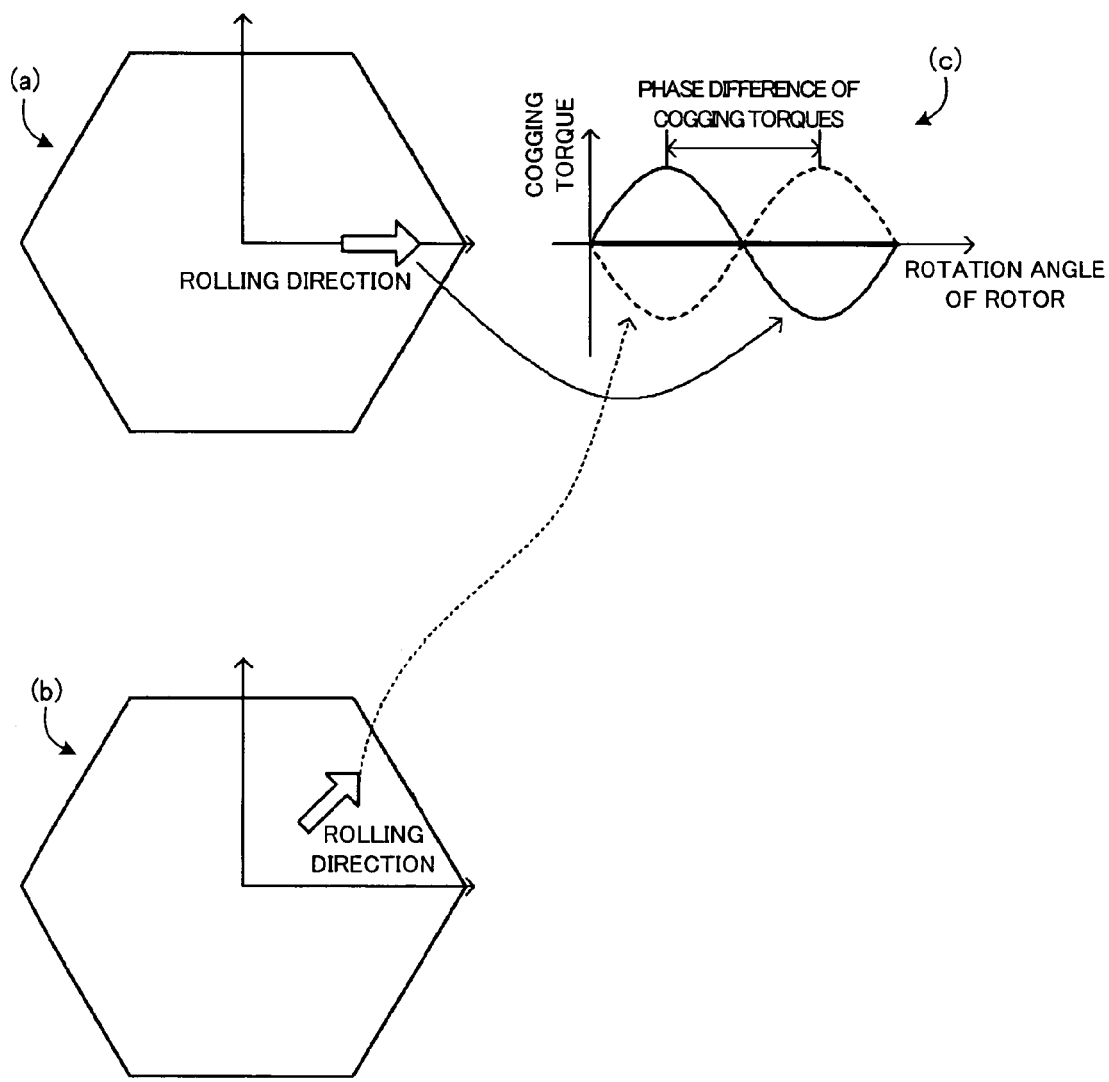
FIG. 13 is a diagram for explaining how cogging torques cancel each other.

FIG. 13 is a diagram for explaining how cogging torques cancel each other when cores having rolling direction angles which produce a phase difference of 180° between the cogging torques exerted on the cores are used. FIGS. 13(a) and 13(b) show a core having a rolling direction angle 0° and a core having a rolling direction angle 45° in the above example, respectively. Since the phase difference between cogging torques exerted on these cores is 180°, by stacking both cores to add cogging torques, the cogging torques cancel each other as shown in FIG. 13(c) (as indicated in thick solid line in FIG. 13(c)).

When two cores are stacked and the rolling direction of one of the two cores is set at the angle 10°, the phase of cogging torque exerted on this core is 320°. Hence, in order to cancel this cogging torque, a core receiving a cogging torque having a phase 140° should be stacked. The rolling direction angle of the core receiving cogging torque having a phase 140° can be obtained on the rectilinear line in FIG. 12.

In FIG. 12, the rolling direction angle at which the phase of cogging torque is 140° is 55°. Hence, by stacking a core having a rolling direction angle (machine angle) 0° and a core having a rolling direction angle (machine angle) 55°, cogging torque depending on the teeth can be reduced. From $$\sin \alpha + \sin(\alpha+\beta) = (\sin(\alpha+\beta) \times \cos(\beta))/2 \qquad (2),$$

when β is 0° or 180°, reduction in cogging torque brought about by adding cogging torques having a phase difference γ is greatest, namely cogging torque is reduced to zero. However, even when β is not 0° nor 180°, the absolute value of $(\cos(\beta))/2$ is always less than or equal to 1. Thus, cogging torque is reduced.

Figure 14A:
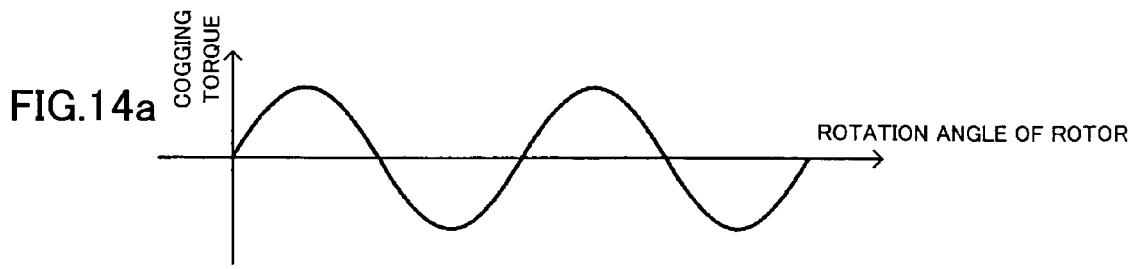
FIGS. 14a to 14e are diagrams for explaining how cogging torque is reduced.
Figure 14B:
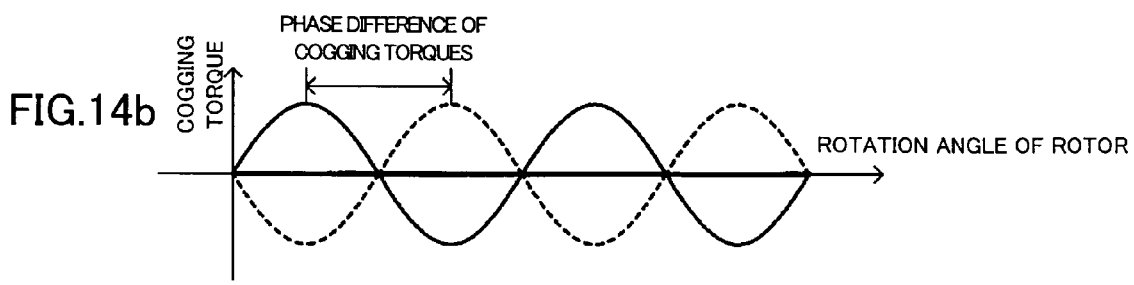

FIGS. 14a to 14e are diagrams for explaining how cogging torque is reduced in this case. FIG. 14a shows cogging torque exerted on a core having a specified rolling direction. As shown in FIG. 14b, when cogging torque having a phase difference of 180° (shown in broken line) is added to this cogging torque, the cogging torques cancel each other (as shown in thick solid line).

Generally, an averaged value of angles having the phase difference of 180° with respect to a reference angle of 0° is a product of 90° and an odd number. Further, when a plurality of cores are stacked to form a laminated core, the phase of cogging torque exerted on the laminated core is determined depending on the ratio of the total height of the cores receiving cogging torque having the same phase to the entire length of the laminated core, and can be represented by Σαt. Suppose that cores receiving cogging torque having a phase α1 (referred to as "cores of phase α1") and cores receiving cogging torque having a phase α2 (referred to as "cores of phase α2") are stacked to form a laminated core for a rotor or a stator. The phase of cogging torque exerted on the laminated core is represented by $(\alpha1 \times t1)+(\alpha2 \times t2)$, where t1 is the ratio of the total height of the cores of phase α1 to the entire length of the laminated core, and t2 is the ratio of the total height of the cores of phase α2 to the entire length of the laminated core.

Thus, when a laminated core used for canceling cogging torque is formed by stacking cores, the phase of cogging torque exerted on this laminated core represented by $\Sigma\alpha t$ can be set within the phase range below:

$$90°\times\text{odd number}-\beta \leq \Sigma\alpha t \leq 90°\times\text{odd number}+\beta \quad (3)$$

Figure 14C:
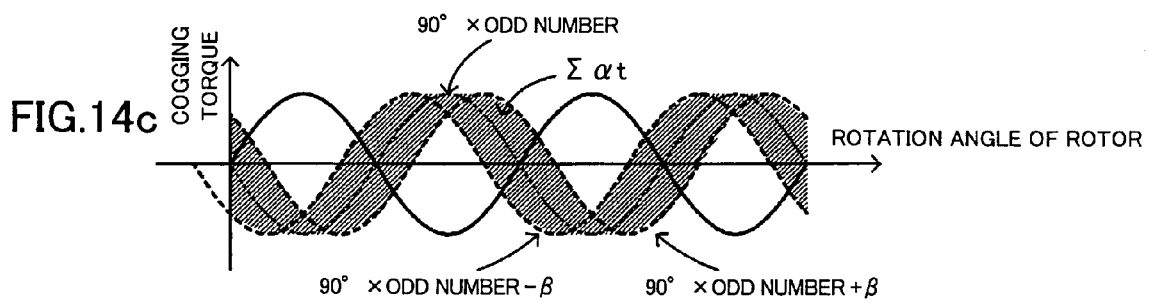
Figure 14D:
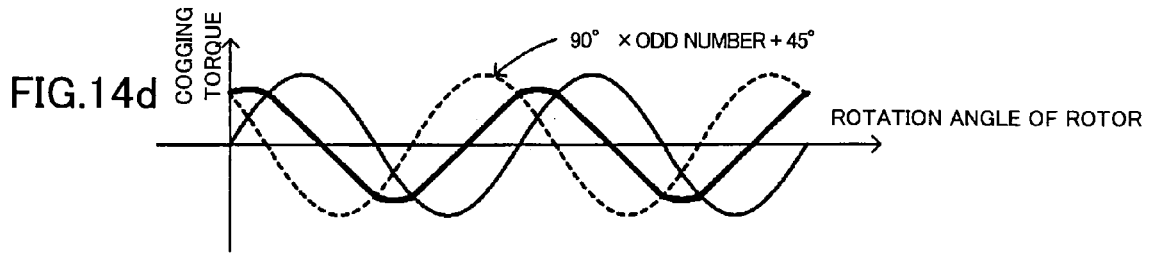

This phase range is represented as the hatched area in FIG. 14c. When $\Sigma\alpha t$ is 90°×odd number, cogging torques cancel each other so that the total cogging torque is zero.

Suppose that cogging torque has 32 cycles per rotation. When cores having a rolling direction angle 0° and cores equal in number and having a rolling direction angle 45° are stacked, the phase $\alpha$ of cogging torque exerted on the cores of rolling direction angle 0° is 0°, and the phase $\alpha$ of cogging torque exerted on the cores of rolling direction angle 45° is 180°. Since the cores of rolling direction angle 0° and the cores of rolling direction angle 45° are equal in number, t=0.5. Hence, $$\Sigma\alpha t = 0°\times 0.5 + 180°\times 0.5 = 90°.$$

This corresponds to the case where $\beta=0°$ in the expression above.

Figure 15:
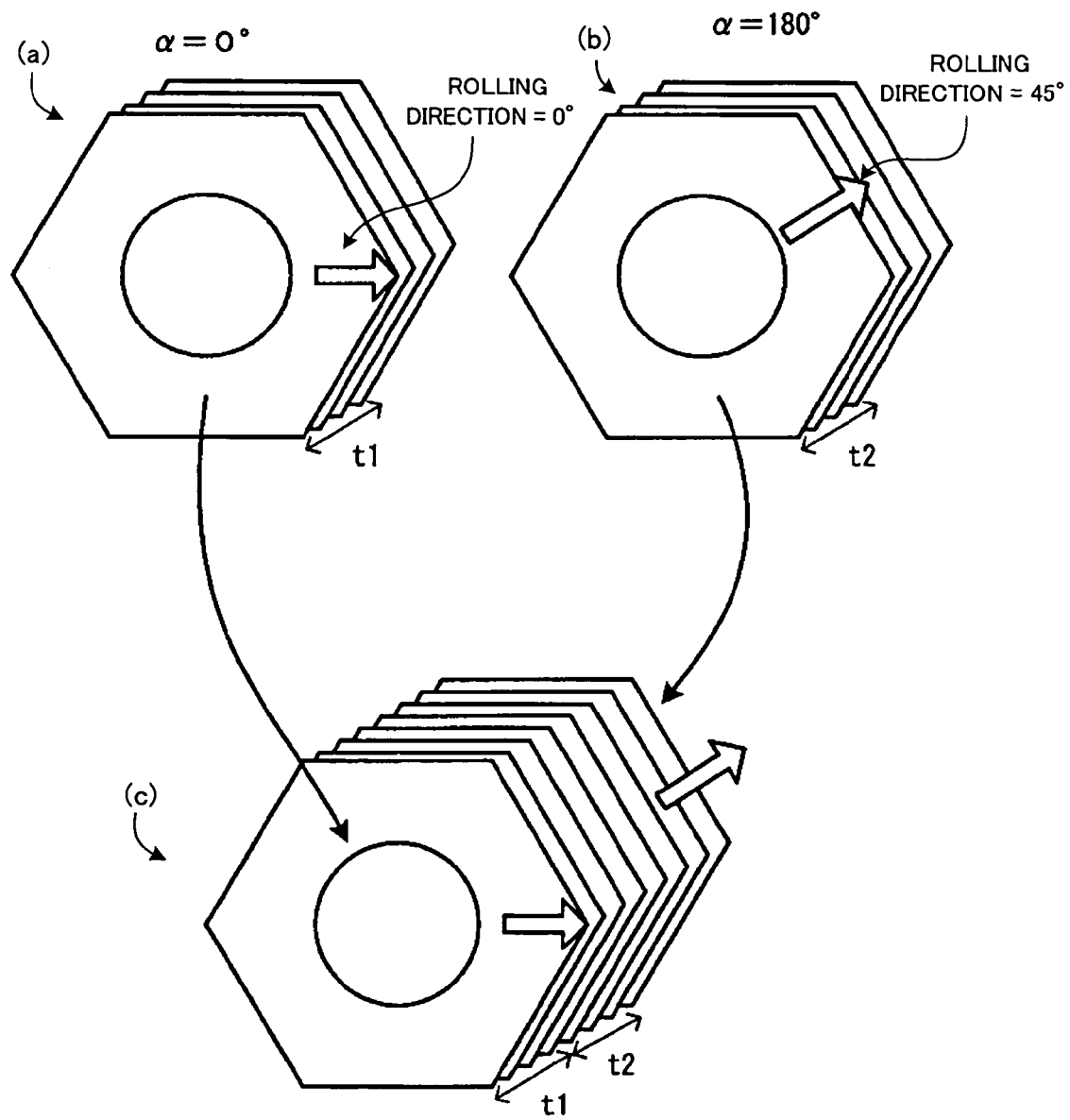
FIG. 15 is a diagram for explaining a combination of cores.

FIG. 15 shows this combination of cores. In FIG. 15, cores (a) of rolling direction angle 0° and phase $\alpha=0°$, and cores (b) of rolling direction angle 45° and phase $\alpha=180°$ are stacked, where the number of cores (a) and the number of cores (b) are arranged so that the ratio of the total height of the cores (a) to the entire length of the laminated core and the ratio of the total height of the cores (b) to the entire length of the laminated core are t1 and t2, respectively.

Figure 14E:
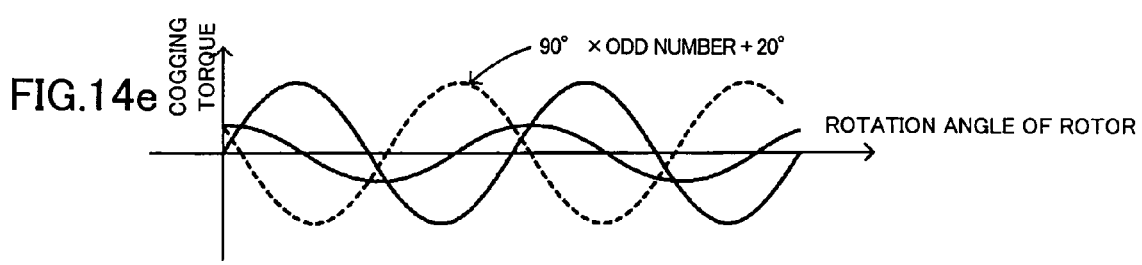

When a phase difference $\pm\beta$ is included, the total cogging torque is reduced to $(\cos(\beta))/2$, although not made zero. For example, when $\beta=45°$, by adding this cogging torque, the total cogging torque is reduced by about 30% (FIG. 14d), and when $\beta=20°$, by adding this cogging torque, the total cogging torque is reduced more greatly (FIG. 14e).

Although two types of cores are stacked in this example, more types of cores can be stacked.

Next, how cores are made by punching them from a core material will be described.

In the present invention, a plurality of cores having different rolling directions are formed by a punching means.

In a first mode for making cores having different rolling directions, rolled electromagnetic sheet steel, which is a core material, is rotated relative to a punching die set by a specified angle, and punching is carried out. A motor manufacturing apparatus rotates a core material by means of a feed mechanism provided inside its frame, and punches a core by means of a punching die set so that the core has a rolling direction skew at a specified angle.

FIGS. 16a and 16b are diagrams for explaining how cores are made in this first mode. In FIG. 16a, a core is punched by a punching die set after the rolling direction of a core material is set at a specified angle to to the punching die set. In the picture (a2) in FIG. 16a, reference sign 5A indicates a punching die set. After a rotor core 1a is punched by the punching die set 5A, the core material is rotated by a specified angle by means of a feed mechanism inside the frame and a core is punched so that the core does not have the same rolling direction as the core punched before, as shown in FIG. 16b. In the picture (b2) in FIG. 16b, the punching die set 5A' is the same as the punching die set 5A. The motor manufacturing apparatus includes, in its feed mechanism, a punching means for rotating a core material by a specified angle and punching a core.

In a second mode for making cores having different rolling directions, a punching die set is rotated relative to rolled electromagnetic sheet steel, which is a core material, by a specified angle, and punching is carried out. A motor manufacturing apparatus rotates a punching die set by means of a feed mechanism provided in its frame, and punches a core by means of the punching die set so that the core has a rolling direction skew at a specified angle.

FIGS. 17a and 17b are diagrams for explaining how cores are made in this second mode. In FIG. 17a, a core is punched by a punching die set after the punching die set is set at a specified angle to the rolling direction of a core material. In the picture (a2) in FIG. 17a, reference sign 5A indicates a punching die set. After a rotor core 1a is punched by the punching die set 5A, the punching die set is rotated by a specified angle by means of a feed mechanism inside the frame and a core is punched by the punching die set so that the core does not have the same rolling direction as the core punched before, as shown in FIG. 17b. In the picture (b2) in FIG. 17b, the punching die set 5A' is the same as the punching die set 5A. The motor manufacturing apparatus includes, in its feed mechanism, a punching means for rotating the die set by a specified angle and punching a core.

In a third mode for making cores having different rolling directions, a plurality of punching die assemblies set at different angles to rolled electromagnetic sheet steel, which is a core material, are prepared and cores are punched by these die assemblies so that the resultant cores have different orientations. A motor manufacturing apparatus has a plurality of punching die assemblies set at different angles to a rolled material.

FIGS. 18a and 18b are diagrams for explaining how cores are made in this third mode. In FIG. 18a, a core is punched by a punching die set after the punching die set is set at a specified angle to the rolling direction of a core material. In the pictures (a2) and (b2) in FIGS. 18a and 18b, reference signs 5A and 5B indicate punching die assemblies. The punching die assemblies 5A and 5B punch rotor cores 1a so that one of the resultant cores 1a has an orientation at the specified angle to the rolling direction.

A laminated core can be made by forming cores having an orientation skew at half a specified angle and using them in pairs.

Figure 19:
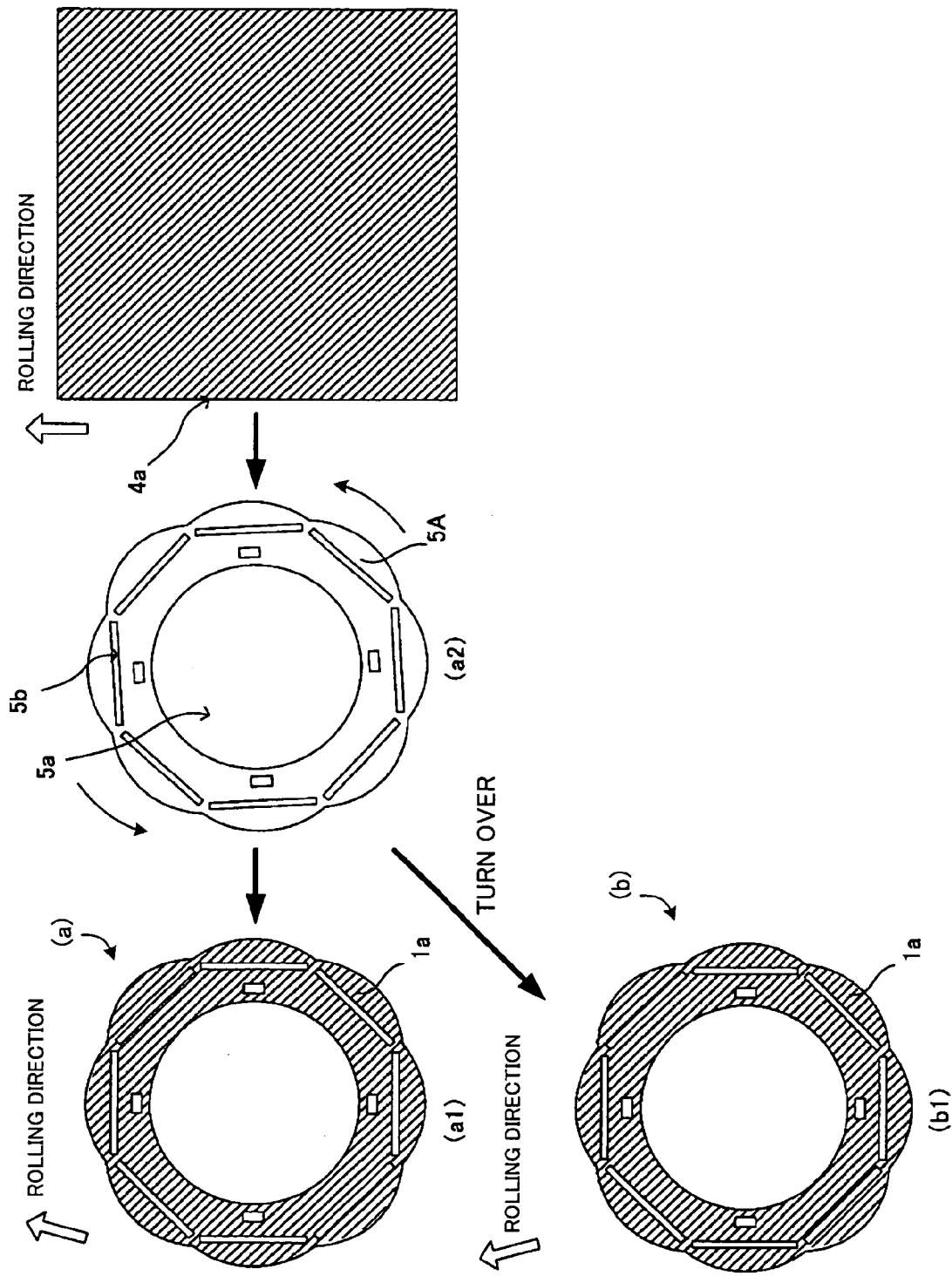
FIG. 19 is a diagram for explaining a first mode for making cores having an orientation skew at half a specified angle.

FIG. 19 shows a first mode for making cores having an orientation skew at half a specified angle. In this mode, a die set for punching a rotor or stator shape skew at half a specified angle to the rolling direction is prepared, and cores punched by this die set are used in pairs such that a core not turned over and a core turned over forms a pair.

In FIG. 19, a die set having an orientation skew at half a specified angle to the rolling direction of a core material is provided. The core material is introduced into this die set, and cores are punched. In FIG. 19, reference sign 5A indicates a die set. The cores 1a punched have an orientation skew at half the specified angle.

A laminated core is made by stacking the cores in pairs such that a core not turned over and a core turned over forms a pair. Thus, between the orientations of the cores stacked in a pair, there is a difference of the specified angle.

FIG. 20 shows a second mode for making cores having an orientation skew at half a specified angle. In this mode, a die set or a core material is set at half a specified angle to the rolling direction, and punching is carried out. Cores made this way are used in pairs such that a core not turned over and a core turned over forms a pair.

In FIG. 20, a core material 4a is set at half a specified angle to the rolling direction of the core material, and cores are punched. In FIG. 20, reference sign 5A indicates a punching die set, into which the core material 4a skew relative to the rolling direction is introduced, and cores are punched. Rotor cores 1a punched have an orientation at half the specified angle to the rolling direction.

A laminated core is made by stacking the cores in pairs such that a core not turned over and a core turned over forms a pair. Thus, between the orientations of the cores stacked in a pair, there is a difference of the specified angle.

Next, how rotor cores and stator cores are punched using a progressive die set. The progressive die set has a plurality of stations arranged in the direction in which a hoop material subjected to punching travels, and in each station, punching is carried out with a die set. FIG. 21 is a diagram for explaining how rotor cores and stator cores are punched with a conventional progressive die set.

In FIG. 21, a die set for punching rotor cores is arranged in a first station A, and a die set for punching stator cores is arranged in a second station B. With this progressive die set, rotor cores and stator cores are formed such that rotor cores are punched in the first station A and stator cores are punched in the second station B. When the progressive die set is viewed as a whole, one rotor core and one stator core are punched at the same time, with one action of punching. Hence, the number of cores made per unit time is twice as many as when a rotor core and a stator core are punched separately. Pilot holes 6 are formed in the hoop material (electromagnetic sheet steel) 4 for use in positioning.

In the example described above, a rotor core and a stator core are each made in one station. However, a rotor core and a stator core may be each made in a plurality of stations each provided for making part of a core. For example, for making rotor cores, one station is provided for punching a shaft hole, one station is provided for punching magnet holes, and one station is provided for punching a rotor outline. For making stator cores, one station is provided for punching a stator center hole, one station is provided for punching slots, one station is provided for punching stator fixing holes, and one station is provided for punching a stator outline.

Next, an example in which the present invention is applied to the above-described progressive die set will be described.

FIG. 22 is a diagram for explaining an example of a progressive die set to which the present invention is applied. In this example, three stations A, B, C are arranged in the direction in which hoop material (electromagnetic sheet steel) 4 travels. A die set for punching rotor cores having an orientation rotated by 0° (referred to as "0°-rotated rotor cores") is provided in the first station A, a die set for punching rotor cores having an orientation rotated by aα (referred to as "α-rotated rotor cores") is provided in the second station B, and a die set for punching stator cores is provided in the third station C.

The hoop material 4 is fed and introduced into the progressive die set, by the length corresponding to one station. With the progressive die set, punching is carried out in two stages. In the first stage, a 0°-rotated rotor core is punched in the first station A and a stator core is punched in the third station C but punching of a rotor core is not carried out in the second station B. Thus, a 0°-rotated rotor core and a stator core are made.

In the second stage, an α-rotated rotor core is punched in the second station B and a stator core is punched in the third station C but punching of a rotor core is not carried out in the first station A. Thus, an α-rotated rotor core and a stator core are made. In which station punching is carried out in the first stage and in the second stage can be controlled by a control device (not shown).

With this progressive die set, 0°-rotated rotor cores (cores having an orientation rotated by 0° relative to the rolling direction of the hoop material), α-rotated rotor cores (cores having an orientation rotated by α relative to the same), and stator cores are made successively. A motor core can be made by aligning and stacking the rotor cores thus made and staking the stator cores thus made.

In this example of the progressive die set to which the present invention is applied, the number of cores made per unit time can be kept at the same level as in the conventional case, although the number of stations is increased. Thus, it is possible to make rotor cores having orientations at different angles to the rolling direction, while maintaining the productivity.

The specified angle mentioned above can be a size corresponding to a plurality of oscillations of cogging torque produced when the rotor rotates. The angle may be somewhat greater or smaller than a size determined by calculating a formula as long as it ensures a desired reduction in cogging torque, taking account of actual magnetic property distribution.

Thus, in the present invention, the angle by which cores in the laminated core is rotated can be a size determined by the formula with an acceptable deviation that ensures a desired reduction in cogging torque.

One of the causes of magnetic anisotropy is crystal orientation of electromagnetic sheet steel. The above-described arrangements according to the present invention can be applied to reduction in magnetic anisotropy due to the crystal orientation of electromagnetic sheet steel. For example, cogging torque due to magnetic anisotropy due to crystal orientation of electromagnetic sheet steel can be reduced by using electromagnetic sheet steel made with the crystal orientation rotated by a specified angle and electromagnetic sheet steel made with the crystal orientation not rotated, in a pair, and using a common die set. Alternatively, cogging torque can be reduced by reducing magnetic anisotropy due to crystal orientation by carrying out punching using a punching die set prepared to have an orientation skew at a specified angle or half a specified angle, or with a punching die set or a core material set at a specified angle or half a specified angle, and stacking cores thus made.

In the case where cores are made with a progressive die set, in order to rotate a die set by a specified angle to reduce cogging torque due to magnetic anisotropy, normally, twice the number of stations are required. Increase in the number of stations makes the entire length of the progressive die set longer, and hence makes it impossible to punch cores with an ordinary press machine. In this connection, the number of stations can be reduced by arranging such that a station not requiring rotation of a die set is shared.

In the progressive die set, after cores are punched, a specified number of cores are stacked in a block. If nothing is done, this stack of cores, which includes cores having a normal orientation and cores having an orientation rotated by a specified angle, cannot be used for a laminated core having a neat outline. Thus, a station for rotating the cores having a rotated orientation so that their rod positions or outline align with those of cores having a normal orientation when stacked is added. In this station, the cores having an orientation rotated by a specified angle are rotated in the opposite direction by the same angle. In the case where two stations are provided for one shape, a station for rotating and thereby aligning cores punched in the two stations and stacking them is provided.

As shown in FIG. 23, when cores are made with a progressive die set, in order to reduce cogging torque due to magnetic anisotropy, cores can be made with a die set rotated by half a specified angle. By staking the cores thus made in pairs such that a core not turned over and a core turned over forms a pair, cogging torque due to magnetic anisotropy can be reduced. In this case, the number of stations in this progressive die set is the same as that in the conventional one, and hence the entire length of this progressive die set is the same as that of the conventional one. Thus, cores can be punched by a conventional press machine.

What is claimed is:

1. An electric motor having a laminated core structure formed by stacking a plurality of core plates made of rolled electromagnetic sheet steel, wherein:

the same number of core plates are stacked with respective rolling directions of the electromagnetic sheet steel angularly displaced by machine angles with respect to a reference angle so as to produce a phase difference of cogging torques by magnetic anisotropy of the core plates, each phase $\alpha$ of the cogging torque is represented by $(360 n/s) \bmod \{360/(m \cdot s)\} \times m \cdot s$, which is a value obtained by multiplying a remainder of division of an angle $(360 n/s)$ of each of slots or poles by an angle $360/(m \cdot s)$ of one cycle of the cogging torque, by $m \cdot s$ which is the number of cycles of the cogging torque per rotation, where s is the number of slots or poles provided in the laminated core structure, and m and n are natural numbers, and said machine angles are determined such that the phase difference of the cogging torques is substantially 180° in an approximately rectilinear relation between the phase of the cogging torque and the machine angle of the rolling direction obtained by connecting the phases at respective angles of the slots or poles.

2. An electric motor according to claim 1, wherein the sum $\Sigma \alpha t$ of products obtained by multiplying respective phases $\alpha$ at the machine angles in the substantially rectilinear relation between the phase of the cogging torque and the machine angle of the rolling direction, and ratios t of the core plates is within a predetermined range having a central value obtained by multiplying 90° by an odd number, where the ratios t are ratios of thickness of the core plates with rolling directions angularly displaced by the machine angles with respect to an entire thickness of the laminated core structure.

3. An electric motor according to claim 1, wherein the natural number m is determined such that the number of cycles m·s per rotation of the cogging torque is close to the number of poles or slots of the laminated core structure, so that the cogging torques cancel each other.

4. An electric motor according to claim 2, wherein the predetermined range is from −45° to 45° with respect to the central value.

5. An electric motor according to claim 2, wherein the core plates comprise two type of core plates having rolling directions of the electromagnetic sheet steel different from each other, and the ratio t of the core plates of each type is 0.5.

6. A motor according to claim 1, wherein the machine angle of the rolling directions is determined taking account of a basic wavelength component and a higher harmonic wave component of the cogging torque.

* * * * *

UNITED STATES PATENT AND TRADEMARK OFFICE
CERTIFICATE OF CORRECTION

PATENT NO. : 7,298,064 B2  
APPLICATION NO. : 11/340522  
DATED : November 20, 2007  
INVENTOR(S) : Tomonaga Yamamoto et al.

It is certified that error appears in the above-identified patent and that said Letters Patent is hereby corrected as shown below:

Column 5, Line 7, change "180°are" to --180° are--.

Column 6, Line 49, after "angle" insert --.--.

Column 11, Line 56, after "to" delete "to". (Second Occurence)

Column 13, Line 50, change "aα" to --α--.

Column 16, Line 21, change "45°" to --+45°--.

Signed and Sealed this

Twentieth Day of May, 2008

JON W. DUDAS  
*Director of the United States Patent and Trademark Office*